US012694649B2

(12) United States Patent　　　　(10) Patent No.:　US 12,694,649 B2
Liu　　　　　　　　　　　　　　　　　　(45) Date of Patent:　　　Jul. 28, 2026

(54) INFORMATION PROCESSING METHOD AND APPARATUS

(71) Applicant: Yinwang Intelligent Technologies Co., Ltd., Shenzhen (CN)

(72) Inventor: Yang Liu, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 223 days.

(21) Appl. No.: 18/494,604

(22) Filed: Oct. 25, 2023

(65) Prior Publication Data

US 2024/0054765 A1　　Feb. 15, 2024

Related U.S. Application Data

(63) Continuation of application No. PCT/CN2021/089904, filed on Apr. 26, 2021.

(51) Int. Cl.
　*G06V 10/771*　　　(2022.01)
　*G06T 17/00*　　　(2006.01)
　*G06V 10/44*　　　(2022.01)
　*G06V 20/56*　　　(2022.01)
(52) U.S. Cl.
　CPC ............ *G06V 10/771* (2022.01); *G06T 17/00* (2013.01); *G06V 10/44* (2022.01); *G06V 20/56* (2022.01)
(58) Field of Classification Search
　CPC ...... G06V 10/771; G06V 10/44; G06V 20/56; G06T 17/00
　See application file for complete search history.

(56) References Cited

U.S. PATENT DOCUMENTS

| | | | | |
|---|---|---|---|---|
| 2018/0060722 A1* | 3/2018 | Hwang | .................. | G06N 3/045 |
| 2022/0230406 A1* | 7/2022 | Ali | .......................... | G06T 17/20 |

FOREIGN PATENT DOCUMENTS

| | | |
|---|---|---|
| CN | 110598771 A | 12/2019 |
| CN | 110620905 A | 12/2019 |
| CN | 110996123 A | 4/2020 |
| CN | 111325144 A | 6/2020 |
| CN | 111488770 A | 8/2020 |
| CN | 112036261 A | 12/2020 |
| WO | 2020142077 A1 | 7/2020 |

OTHER PUBLICATIONS

Loper et al., "Errata for SMPL: A Skinned Multi-Person Linear Model," ACM Transactions on Graphics (TOG), Oct. 26, 2015, 1 page.
Romero et al., "Embodied Hands:Modeling and Capturing Hands and Bodies Together," CoRR, submitted on Jan. 7, 2022, arXiv: 2201.02610v1, 19 pages.

(Continued)

*Primary Examiner* — David Perlman
(74) *Attorney, Agent, or Firm* — Fish & Richardson P.C.

(57) ABSTRACT

This application describes examples of an information processing method and apparatus. In one example, the method includes: obtaining an image; inputting the image into a feature extraction model; obtaining, from the feature extraction model, a first feature map; inputting the first feature map into a first semantic recognition model; and obtaining, from the first semantic recognition model, first target semantic information.

20 Claims, 23 Drawing Sheets

(56) References Cited

OTHER PUBLICATIONS

Li et al., "Learning a model of facial shape and expression from 4D scans," ACM Transactions on Graphics, vol. 36, No. 6, Nov. 2017, 17 pages.

Blanz et al., "A Morphable Model for the Synthesis of 3D Faces," Proceedings of the 26th annual conference on Computer graphics and interactive techniques, Jul. 1999, pp. 187-194.

Shelton, "Morphable Surface Models," International Journal of Computer Vision, Feb. 2000, 29 pages.

International Search Report and Written Opinion in International Appln. No. PCT/CN2021/089904, mailed on Dec. 23, 2021, 18 pages (with English translation).

Xiang et al., "PoseCNN: A Convolutional Neural Network for 6D Object Pose Estimation in Cluttered Scenes," CoRR, sumitted on Nov. 1, 2017, arXiv: 1711.00199v1, 9 pages.

Extended European Search Report in European Appln No. 21938214.0, dated Apr. 30, 2024, 10 pages.

* cited by examiner

No drowsy
driving!

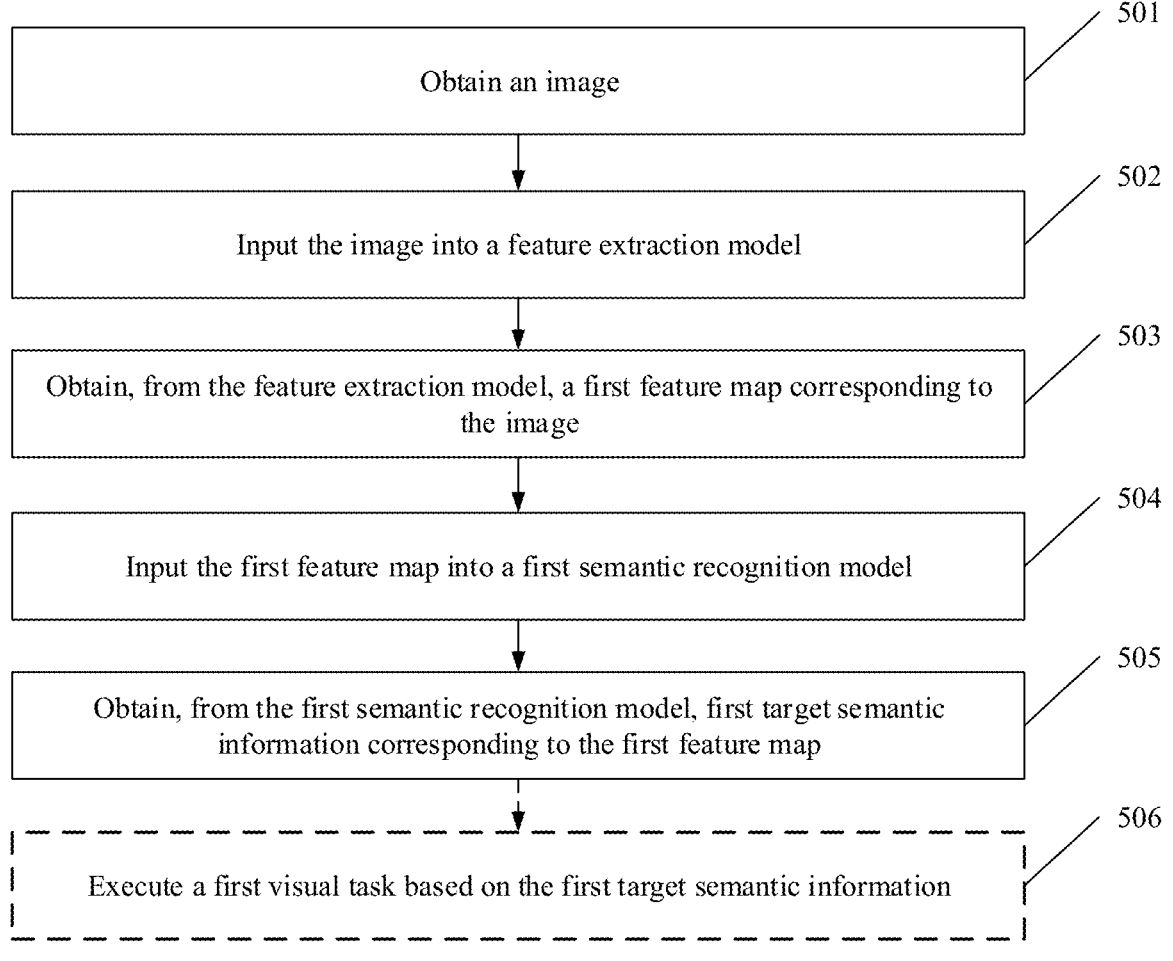

501

Obtain an image

502

Input the image into a feature extraction model

503

Obtain, from the feature extraction model, a first feature map corresponding to the image

504

Input the first feature map into a first semantic recognition model

505

Obtain, from the first semantic recognition model, first target semantic information corresponding to the first feature map

506

Execute a first visual task based on the first target semantic information

FIG. 5A

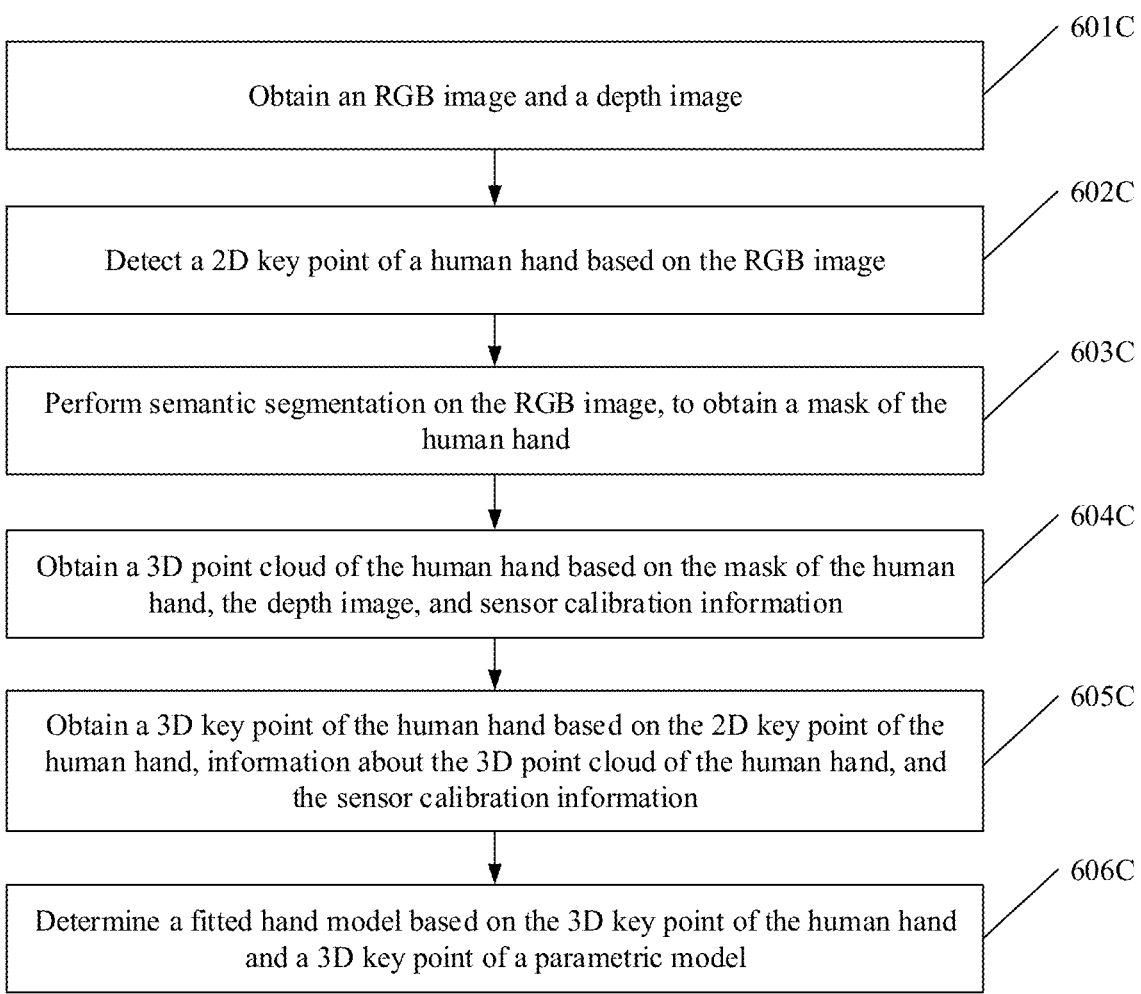

Obtain an RGB image and a depth image — 601C

Detect a 2D key point of a human hand based on the RGB image — 602C

Perform semantic segmentation on the RGB image, to obtain a mask of the human hand — 603C Obtain a 3D point cloud of the human hand based on the mask of the human hand, the depth image, and sensor calibration information — 604C Obtain a 3D key point of the human hand based on the 2D key point of the human hand, information about the 3D point cloud of the human hand, and the sensor calibration information — 605C Determine a fitted hand model based on the 3D key point of the human hand and a 3D key point of a parametric model — 606C

FIG. 6C

INFORMATION PROCESSING METHOD AND APPARATUS

CROSS-REFERENCE TO RELATED APPLICATIONS

This application is a continuation of International Application No. PCT/CN2021/089904, filed on Apr. 26, 2021, the disclosure of which is hereby incorporated by reference in its entirety.

TECHNICAL FIELD

This application relates to the field of artificial intelligence, and in particular, to an information processing method and apparatus.

BACKGROUND

Computer vision is an important branch in the field of artificial intelligence, and means that a computer can replace a human eye and a brain to perform visual cognition on an environment and a stimulus (or referred to as an object) in the environment. For example, the computer recognizes semantic information expressed by a hand posture of a person. The computer can execute a visual task based on a visual cognition result. For example, by obtaining and processing an image of a driver, the computer can recognize whether the driver is drinking water. Based on this recognition result, the computer can play voice information "Driving safely" when the driver is drinking water.

Accuracy of the computer in executing the visual task depends on accuracy of the visual cognition. However, a visual system used to implement computer vision generally has high complexity, and costs of adjusting or optimizing the visual system are high. This is not conducive to continuous optimization of the visual system, and further affects accurate execution of the visual task.

SUMMARY

Embodiments of this application provide an information processing method and apparatus, to perform a perceptible visual cognition process on an obtained image, so as to facilitate adjustment or optimization of the visual cognition process. This helps continuously optimize a visual system, and further improve accuracy of executing a visual task by a computer.

The following separately describes the method and the apparatus in embodiments of this application.

According to a first aspect, an embodiment of this application provides an information processing method. The method may be applied to a first device. The first device can recognize, based on an image of a target object, semantic information expressed by a form of the target object.

Specifically, a feature extraction model and a semantic recognition model are disposed in the first device. Both the two models are obtained through training by using a machine learning method. An input of the feature extraction model is an image, the feature extraction model is used to extract a feature map of the target object based on the input image, and the extracted feature map is used to describe a form of the target object corresponding to a corresponding image. In a possible implementation, for example, an image or a video frame including the target object can be obtained through performing an operation like visualization processing (for example, rendering) on the feature map. A form of the target object in the image or the video frame is the form described by the feature map. An input of the semantic recognition model is a feature map of the target object. The semantic recognition model is used to determine semantic information based on the input feature map. The semantic information is a meaning expressed by a form that is described by the feature map, for example, yawning. Optionally, the semantic recognition model is used to provide semantic information for a visual task. It is considered that the first device may provide semantic information for a plurality of visual tasks. Therefore, the semantic recognition model in the first aspect is referred to as a first semantic recognition model, the semantic information output by the semantic recognition model is referred to as first semantic information, and a visual task served by the first semantic information is referred to as a first visual task.

Based on the foregoing two models, the first device may perform the following visual cognition process.

First, the first device may obtain an image. An object described by the image includes a target object, and optionally, may further include another object (referred to as a background) other than the target object. It is assumed that the target object is a person, and another object (for example, a sofa, a television, or a wall) other than the person in the image is the background. The image can capture a specific form of the target object.

After obtaining the image, the first device inputs the image into the feature extraction model, and obtains, from the feature extraction model, a first feature map corresponding to the image. The first feature map is a feature map that is of the target object and that is extracted by the feature extraction model based on the input image. The first feature map is used to describe a first form of the target object. In a possible implementation, an image or a video frame including the target object can be obtained through performing an operation like visualization processing (for example, rendering) on the first feature map. A form of the target object in the image or the video frame is the first form described by the feature map. For example, it is assumed that the person is yawning when being photographed. In this case, after an image obtained through photographing is input into the feature extraction model, the extracted first feature map is used to describe a posture in which the person is yawning.

After obtaining the first feature map, the first device inputs the first feature map into the first semantic recognition model, and obtains first target semantic information from the first semantic recognition model. The first target semantic information is semantic information recognized from the first feature map that is input into the first semantic recognition model. The first target semantic information is used to describe a meaning expressed by the first form. For example, it is assumed that the first feature map is used to describe a posture in which the person is yawning. In this case, the first target semantic information may indicate that the target object is yawning.

Based on the technical solutions provided in the first aspect of embodiments of this application, in a process of performing visual cognition on the obtained image, the first device first obtains a first feature map through learning from the image, where the first feature map is used to describe the first form of the target object. Then, the first device obtains the first target semantic information through learning from the first feature map. Different from an existing visual cognition process in which semantic information is directly obtained through learning from an image, in the visual cognition process performed in this embodiment of this application, after the image is obtained and before the first target semantic information is obtained, the first feature map describing the first form can be obtained. This helps improve a perceptibility degree of the visual cognition process, and facilitates adjustment or optimization of the visual cognition process, thereby helping continuously optimize a visual system, and further improving accuracy of executing a visual task by a computer.

For example, when the first target semantic information output by the first semantic recognition model is incorrect, maintenance personnel may quickly locate a problem by viewing the first feature map output by the feature extraction model. If the first feature map can accurately describe the first form of the target object, the maintenance personnel can quickly locate the problem in the first semantic recognition model. If the first feature map cannot accurately describe the first form of the target object, the maintenance personnel can quickly locate the problem in the feature extraction model. A model in which the problem exists is located. This helps reduce repairing costs of a corresponding problem by the maintenance personnel, helps continuously optimize accuracy of visual cognition, and further improves accuracy of executing a visual task by a computer.

Optionally, the feature extraction process mentioned in this embodiment of this application may be understood as a process of performing visual processing on an input image. For example, the feature map extracted by using the feature extraction model may include at least one of the following feature maps: a primal sketch obtained through performing low-level visual processing on the input image, an intrinsic image obtained through performing middle-level visual processing on the input image, and a three-dimensional model obtained through performing high-level visual processing on the input image.

When the feature map is compared with the input image, optionally, a quantity of points in a point cloud corresponding to the feature map may be less than a quantity of points in a point cloud corresponding to the image. For example, a quantity of points in a point cloud corresponding to the primal sketch or the intrinsic image may be less than the quantity of points in the point cloud corresponding to the image. Alternatively, optionally, a quantity of points in a point cloud corresponding to the feature map may be greater than the quantity of points in the point cloud corresponding to the image. For example, a quantity of points in a point cloud corresponding to the three-dimensional model may be greater than the quantity of points in the point cloud corresponding to the image.

Optionally, with reference to the first aspect, in a first possible implementation of the first aspect, a training process of the feature extraction model and a training process of the first semantic recognition model are independent of each other.

In a possible implementation, that a training process of the feature extraction model and a training process of the first semantic recognition model are independent of each other may be understood as the following: When a weight of the feature extraction model is updated, a weight of the first semantic recognition model remains unchanged. Similarly, when a weight of the first semantic recognition model is updated, a weight of the feature extraction model remains unchanged.

In a possible implementation, that a training process of the feature extraction model and a training process of the first semantic recognition model are independent of each other may be understood as the following: The feature extraction model and the first semantic recognition model are separately obtained through training by using different samples.

In a possible implementation, the samples used in the feature extraction model and the first semantic recognition model carry labels. In a possible implementation, that a training process of the feature extraction model and a training process of the first semantic recognition model are independent of each other may be understood as the following: Samples separately used in the training process of the feature extraction model and the training process of the first semantic recognition model carry different types of labels. For example, visualization processing can be performed on the label carried in the sample for training the feature extraction model, to obtain an image or a video frame. The label carried in the sample for training the first semantic recognition model is a meaning that can be expressed by a form of a target object, and an image or a video frame cannot be obtained through performing visualization processing on the label carried in the sample for training the first semantic recognition model.

Because the training process of the feature extraction model and the training process of the first semantic recognition model are independent of each other, a possible beneficial effect that can be implemented by the solution in this embodiment of this application includes: The feature extraction model is optimized, which helps improve accuracy (for example, the first feature map can describe the first form more accurately) of the first feature map obtained from the feature extraction model; and the first semantic recognition model performs semantic recognition on the first feature map that has higher accuracy, which helps improve accuracy of the first target semantic information obtained from the first semantic recognition model.

Because the training process of the feature extraction model and the training process of the first semantic recognition model are independent of each other, another possible beneficial effect that can be implemented by the solution in this embodiment of this application includes: When accuracy of a visual cognition result is low, the feature extraction model or the first semantic recognition model may be optimized based on the first feature map, and an entire visual system does not need to be optimized. This helps reduce optimization costs of the visual system. For example, when a problem is located to the first semantic recognition model, only the first semantic recognition model needs to be trained. When a problem is located to the feature extraction model, only the feature extraction model needs to be trained. This helps reduce training costs of the visual system, and further helps continuously optimize accuracy of visual cognition.

Structures or types of the feature extraction model and the first semantic recognition model are not limited in this embodiment of this application. In a possible implementation, the feature extraction model corresponds to one or more machine learning models (for example, a neural network model). In a possible implementation, the first semantic recognition model corresponds to one or more machine learning models (for example, a neural network model). In a possible implementation, the feature extraction model and the first semantic model may be integrated into a same machine learning model (for example, a neural network model). In a possible implementation, the feature extraction model corresponds to one or more network layers in one neural network model. In a possible implementation, the first semantic recognition model corresponds to one or more network layers in one neural network model.

Optionally, with reference to the first aspect or the first possible implementation, in a second possible implementation of the first aspect, after the first device inputs an image into the feature extraction model, the feature extraction model fits the target object based on the image by using a parametric model, to obtain a three-dimensional model fitting the target object. The first feature map includes information about the three-dimensional model.

Optionally, the three-dimensional model is a result obtained through higher-level visual processing. The information about the three-dimensional model helps the first semantic recognition model output more accurate semantic information.

Optionally, with reference to the second possible implementation of the first aspect, in a third possible implementation of the first aspect, the information about the three-dimensional model includes information about each grid vertex in the three-dimensional model, or includes information about each fitting parameter, where the information about the fitting parameter is used to determine the three-dimensional model based on the parametric model; or the information about the three-dimensional model includes information about some grid vertices and information about some fitting parameters.

Optionally, with reference to the third possible implementation of the first aspect, in a fourth possible implementation of the first aspect, the first semantic recognition model may obtain information about the parametric model, and determine first target semantic information based on the first target feature and the parametric model. This helps reduce an amount of input data of the first semantic recognition model.

Optionally, with reference to any one of the first aspect or the first to the third possible implementations of the first aspect, in a fifth possible implementation of the first aspect, the first device may further provide semantic information for another visual task other than the first visual task, and the another visual task is referred to as a second visual task. A semantic recognition model that provides semantic information for the second visual task is referred to as a second semantic recognition model, and semantic information output by the semantic recognition model is referred to as second semantic information. For understanding of the second semantic recognition model, refer to descriptions of the semantic recognition model in the first aspect. Details are not described herein again.

If the second visual task is a task executed based on visual cognition for the target object, in a conventional technology, because semantic information is directly obtained through learning from an obtained image in a visual cognition process, if a computer needs to execute N visual tasks, the computer needs at least N mutually independent visual cognition processes to execute the N visual tasks. N is a positive integer. Different visual cognition processes in the N visual cognition processes may need to perform visual cognition on a same target object in a same image. Such different visual cognition processes are referred to as visual cognition processes associated with each other. A plurality of visual cognition processes associated with each other generally have a same image processing process (for example, the low-level visual processing process described above, and specifically, for example, a semantic segmentation process for a target object). In this embodiment of this application, such a same image processing process is referred to as a redundant process. Existence of the redundant process wastes computer resources. As a quantity of visual tasks continuously increases, a quantity of visual cognition processes associated with each other also increases. A large quantity of redundant processes waste more computer resources and reduce computer performance.

To resolve the foregoing problem, optionally, with reference to the fifth possible implementation of the first aspect, in a sixth possible implementation of the first aspect, after the first device inputs the image into the feature extraction model, the first device obtains, from the feature extraction model, a second feature map corresponding to the image. The second feature map is a feature map that is of the target object and that is extracted by the feature extraction model based on the input image. The second feature map describes a second form of the target object. In a possible implementation, for example, an image or a video frame including the target object can be obtained through performing an operation like visualization processing (for example, rendering) on the second feature map. A form of the target object in the image or the video frame is the second form described by the feature map. The second feature map is a feature map obtained by the feature extraction model through learning from the obtained image. The first device inputs the second feature map into a second semantic recognition model, where the second semantic recognition model is used to determine second semantic information based on the input feature map. The first device obtains second target semantic information from the second semantic recognition model. The second target semantic information is semantic information that is extracted and determined by the second semantic recognition model based on the input second feature map. The second target semantic information describes a meaning expressed by the second form.

In this embodiment of this application, the first device performs image processing on the obtained image by using the feature extraction model, to obtain input information (namely, the first feature map) required by the first semantic recognition model and input information (namely, the second feature map) required by the second semantic recognition model. Then, the first feature map continues to be processed by using the first semantic recognition model, to obtain the first target semantic information; and the second feature map continues to be processed by using the second semantic recognition model, to obtain the second target semantic information. It can be learned that the first device obtains, from the feature extraction model, the first feature map required by the first semantic recognition model and the second feature map required by the second semantic recognition model, thereby helping reduce a redundant process between a visual cognition process (referred to as a first visual cognition process) corresponding to the first target semantic information and a visual cognition process (referred to as a second visual cognition process) corresponding to the second target semantic information. Further, this helps save resources of the first device, and helps improve visual cognition performance of the first device.

In a possible implementation, the resources of the device in this embodiment of this application may be, for example, one or more of resources such as a computing resource, a storage resource, and a network resource of the device.

The second feature map and the first feature map may be the same or may be different. When the two are the same, the first form and the second form are the same, and the step "The first device obtains the second feature map from the feature extraction model" may not be repeatedly performed. That the first feature map and the second feature map are different may mean that visual processing levels corresponding to the first feature map and the second feature map are different. For example, if the first semantic recognition model may determine the first target semantic information based on a two-dimensional image, and the second semantic recognition model needs to determine the second target semantic information based on a three-dimensional image, the first feature map may be a feature map obtained through low-level visual processing, and the second feature map may be a feature map obtained through sequentially performing low-level visual processing and middle-level visual processing, or the second feature map is a feature map obtained through sequentially performing low-level visual processing, middle-level visual processing, and high-level visual processing. If the first feature map and the second feature map are different, the first form and the second form may also be different.

Optionally, the first target semantic information and the second target semantic information are different. Even if the first form and the second form are the same, because visual tasks served by the first target semantic information and the second target semantic information service are different, meanings obtained through "understanding" the same form may be different. For example, if the first visual task is to give a reminder when a driver is yawning, and the second visual task is to perform sound content detection when the driver opens a mouth, for a yawning posture of the driver, the first target semantic information obtained by using the first semantic recognition model may be that "The driver is yawning", and the second target semantic information obtained by using the second semantic recognition model may be that "The driver opens his mouth".

Optionally, with reference to the sixth possible implementation of the first aspect, in a seventh possible implementation of the first aspect, the training process of the first semantic recognition model and a training process of the second semantic recognition model are independent of each other. That the training processes are independent of each other may be understood as the following: When a weight of the first semantic recognition model is updated, a weight of the second semantic recognition model remains unchanged. Similarly, when a weight of the second semantic recognition model is updated, a weight of the first semantic recognition model remains unchanged.

Optionally, with reference to any one of the first aspect or the first to the seventh possible implementations of the first aspect, in an eighth possible implementation of the first aspect, the first device may execute the first visual task based on the first target semantic information, or send a first message to a second device based on the first target semantic information, where the first message indicates the second device to execute the first visual task.

Optionally, with reference to the seventh possible implementation of the first aspect, in a ninth possible implementation of the first aspect, the first device may execute the second visual task based on the second target semantic information, or send a second message to a second device based on the second target semantic information, where the second message indicates the second device to execute the second visual task.

That the first device executes the first visual task based on the first target semantic information and executes the second visual task based on the second target semantic information is referred to as Case 1. Case 1 is described below.

An execution sequence between the first visual task and the second visual task is not limited in this embodiment of this application.

Optionally, that the first visual task and the second visual task are different may be reflected in the following: The first visual task and the second visual task belong to different task types in the following task types: behavior recognition, human posture estimation, scenario understanding, semantic segmentation, target detection, and image classification.

Alternatively, optionally, that the first visual task and the second visual task are different may be reflected in the following: Information types output in a process of executing the first visual task and the second visual task are different. The information types include but are not limited to voice information, an image, and control information. Alternatively, when the information types are the same, information content is different. For example, different voice information or images are output, or output control information is used to control different devices. That the first device sends the first message to the second device based on the first target semantic information and sends the second message to the second device based on the second target semantic information is referred to as Case 2. For understanding of Case 2, refer to the foregoing description of Case 1. Details are not described herein again.

With reference to the first aspect or the first to the ninth possible implementations of the first aspect, in a tenth possible implementation of the first aspect, the image is from sensing information of a vehicle-mounted sensor.

With reference to the tenth possible implementation of the first aspect, in an eleventh possible implementation of the first aspect, the sensor includes at least one of the following sensors: a radar, an infrared detector, a depth camera, a full-color camera, and a fisheye camera. The radar includes an ultrasonic radar, a microwave radar, a laser rangefinder, and the like.

With reference to the first aspect or the first to the eleventh possible implementations of the first aspect, in a twelfth possible implementation of the first aspect, the target object includes a person, a vehicle, or a road scenario.

With reference to the first aspect or the first to the twelfth possible implementations of the first aspect, in a thirteenth possible implementation of the first aspect, the first device is a vehicle. Optionally, the image is obtained by a sensor system on the vehicle.

With reference to the first aspect or the first to the thirteenth possible implementations of the first aspect, in a fourteenth possible implementation of the first aspect, this embodiment of this application is used to support a visual task in the second device (for example, a vehicle). For example, optionally, the first device is a server or a cloud-side device. After obtaining the image, a sensor on the vehicle sends the image to the first device. After obtaining the first target semantic information based on the image, the first device sends the first target semantic information to the vehicle, to indicate the vehicle to execute the first visual task based on the first target semantic information.

This embodiment of this application further provides an image processing method. The method includes: obtaining an image of the target object; obtaining, based on the image and a preset parametric model of the target object, a model parameter that is of the target object and that is based on the parametric model, where the model parameter indicates a three-dimensional model of the target object; and obtaining first semantic information of the image based on the model parameter.

Optionally, the obtaining, based on the image and a preset parametric model of the target object, a model parameter that is of the target object and that is based on the parametric model specifically includes: obtaining a first three-dimensional model based on a preset human body parametric model and a primal parameter; performing rendering based on the first three-dimensional model, to obtain an error value obtained after fitting the image of the target object; and obtaining a model parameter, where an error between an image obtained through performing rendering based on the three-dimensional model of the model parameter and the image of the target object is less than a preset threshold.

Optionally, the image includes an RGB image and a depth image. The obtaining, based on the image and a preset parametric model of the target object, a model parameter that is of the image and that is based on the parametric model specifically includes: obtaining a two-dimensional key point of the target object in the RGB image; obtaining a three-dimensional point cloud of the target object based on the RGB image and the depth image; obtaining a three-dimensional key point of the target object based on the two-dimensional key point and the three-dimensional point cloud; and performing fitting based on the three-dimensional key point and the parametric model, to obtain the model parameter.

Optionally, the obtaining first semantic information of the image based on the model parameter specifically includes: inputting the model parameter into a preset deep learning network model for classification, to obtain the first semantic information.

Optionally, the method further includes: obtaining second semantic information of the image based on the model parameter.

Optionally, the target object includes a first target object and a second target object. The first target object is one of a person, a vehicle, or a road scenario; the second target object is one of a person, a vehicle, or a road scenario; and the first target object and the second target object are different. The model parameter includes a first model parameter of the first target object and a second model parameter of the second target object. The obtaining first semantic information of the image based on the model parameter specifically includes: obtaining the first semantic information based on the first model parameter and the second model parameter. Optionally, the target object includes a person, a vehicle, or a road scenario. Optionally, the image includes at least one of the following: an RGB image, a grayscale image, or a depth image.

According to a second aspect, an embodiment of this application provides an information processing apparatus. The information processing apparatus may be the first device mentioned in the first aspect, or an apparatus in the first device, or an apparatus that can match the first device for use. In a design, the information processing apparatus may include a module for performing the method/operation/step/action described in any one of the first aspect or the possible implementations of the first aspect in a one-to-one correspondence. The module may be a hardware circuit, or may be a module in a form of software, or may be a module implemented by a hardware circuit in combination with software. For example, the information processing apparatus includes a storage unit and a processing unit. The storage unit is configured to store program instructions, and the processing unit is configured to execute the instructions (or referred to as computer program instructions, a function program, or program code) in the storage unit, to implement the method described in any one of the first aspect or the possible implementations of the first aspect.

In a possible design, according to a third aspect, an embodiment of this application provides an information processing apparatus. The information processing apparatus includes an image obtaining module, a feature extraction module, and a semantic recognition module. The image obtaining module is configured to obtain an image. The feature extraction module is configured to input the image obtained by the image obtaining module into a feature extraction model, where the feature extraction model is used to extract a feature map of a target object based on the input image. The feature extraction module is further configured to obtain a first feature map corresponding to the image from the feature extraction model, where the first feature map is the feature map that is of the target object and that is extracted by the feature extraction model based on the input image, and the first feature map describes a first form of the target object. The semantic recognition module is configured to input the first feature map obtained by the feature extraction module into a first semantic recognition model, where the first semantic recognition model is used to determine first semantic information based on the input feature map. The semantic recognition module is further configured to: obtain, from the first semantic recognition model, first target semantic information corresponding to the image, where the first target semantic information is semantic information that is extracted and determined by the first semantic recognition model based on the input first feature map, and the first target semantic information describes a meaning expressed by the first form.

Based on the third aspect, in a first possible implementation of the third aspect, a training process of the feature extraction model and a training process of the first semantic recognition model are independent of each other.

Based on the third aspect or the first possible implementation of the third aspect, in a second possible implementation of the third aspect, the first feature map includes information about a three-dimensional model. The three-dimensional model is determined by the feature extraction model by fitting the target object based on the image by using a parametric model.

Based on the second possible implementation of the third aspect, in a third possible implementation of the third aspect, the information about the three-dimensional model includes information about a grid vertex in the three-dimensional model, and/or information about a fitting parameter, where the information about the fitting parameter is used to determine the three-dimensional model based on the parametric model.

Based on any one of the third aspect or the first to the third possible implementations of the third aspect, in a fourth possible implementation of the third aspect, the feature extraction module is further configured to: after inputting the image into the feature extraction model, obtain, from the feature extraction model, a second feature map corresponding to the image, where the second feature map is a feature map that is of the target object and that is extracted by the feature extraction model based on the input image, and the second feature map describes the second form. The semantic recognition module is further configured to input the second feature map obtained by the feature extraction module into a second semantic recognition model, where the second semantic recognition model is used to determine second semantic information based on the input feature map. Then, the semantic recognition module obtains, from the second semantic recognition model, second target semantic information corresponding to the second feature map, where the second target semantic information describes a meaning expressed by the second form.

Based on the fourth possible implementation of the third aspect, in a fifth possible implementation of the third aspect, the training process of the first semantic recognition model and a training process of the second semantic recognition model are independent of each other.

Based on any one of the third aspect or the first to the fifth possible implementations of the third aspect, in a sixth possible implementation of the third aspect, the information processing apparatus further includes a task execution module, where the task execution module is configured to execute a first visual task based on the first target semantic information.

Based on the fifth and the sixth possible implementations of the third aspect, in a seventh possible implementation of the third aspect, the task execution module is further configured to execute a second visual task based on the second target semantic information.

Based on any one of the third aspect or the first to the fifth possible implementations of the third aspect, in an eighth possible implementation of the third aspect, the information processing apparatus further includes a communication module, where the communication module is configured to send a first message to a second device, and the first message indicates the second device to execute the first visual task.

Based on the fifth and the eighth possible implementations of the third aspect, in a ninth possible implementation of the third aspect, the communication module is further configured to send a second message to the second device, where the second message indicates the second device to execute the second visual task.

Based on any one of the third aspect or the first to the ninth possible implementations of the third aspect, in a tenth possible implementation of the third aspect, the image is obtained by a sensor on a vehicle.

Based on the tenth possible implementation of the third aspect, in an eleventh possible implementation of the third aspect, the sensor includes at least one of the following sensors: a radar, an infrared detector, a depth camera, a full-color camera, and a fisheye camera.

Based on any one of the third aspect or the first to the eleventh possible implementations of the third aspect, in a twelfth possible implementation of the third aspect, the target object includes a person, a vehicle, or a road scenario.

According to a fourth aspect, an embodiment of this application provides a computing device, where the computing device includes a processor and a memory. The processor is coupled to the memory. When the processor executes instructions (or computer-readable instructions, computer program instructions, a function program, or program code) stored in the memory, the method performed by the first device in any one of the first aspect or the possible implementations of the first aspect can be performed.

Optionally, these instructions are stored in a memory outside the computing device. When these instructions are decoded and executed by the processor of the computing device, the memory in the computing device temporarily stores some or all content of the instructions. Optionally, some content of these instructions is stored in the memory outside the computing device, and other content of these instructions is stored in the memory inside the computing device. In a possible implementation, the computing device may be a server or an apparatus (for example, an apparatus implemented by software, hardware, or a combination of software and hardware) in a server. Alternatively, in a possible implementation, the computing device may be a terminal or an apparatus (for example, an apparatus implemented by software, hardware, or a combination of software and hardware) in a terminal. In a possible implementation, the computing device may be a computer device.

Based on the fourth aspect, in a possible design, the computing device may further include a sensor system. The sensor system is configured to obtain an image. Optionally, when performing the method described in any one of the first aspect or the possible implementations of the first aspect, the computing device obtains an image by using the sensor system. Optionally, the computing device may be a vehicle-mounted terminal or an apparatus in a vehicle-mounted terminal, a handheld terminal or an apparatus in a handheld terminal, or the like.

Based on the fourth aspect, in a possible design, the computing device may further include a communication interface.

Based on the communication interface included in the computing device, optionally, the processor of the computing device obtains an image from the second device through the communication interface. Optionally, the second device may include a sensor system, to obtain an image. Optionally, the second device may be a terminal, for example, a vehicle-mounted terminal or a handheld terminal.

Based on the communication interface included in the computing device, optionally, the processor of the computing device sends a message to the second device through the communication interface. The message is generated based on the first target semantic information mentioned in the first aspect or any possible implementation of the first aspect, to indicate the second device to execute the first visual task. Alternatively, optionally, the message is generated based on the second target semantic information mentioned in the sixth possible implementation of the first aspect, to indicate the second device to execute the second visual task.

A fifth aspect of this application provides a chip system, where the chip system includes a processor and an interface circuit. The processor is coupled to a memory through the interface circuit, and the processor is configured to execute instructions (or computer-readable instructions, computer program instructions, a function program, or program code) in the memory, to implement the method described in any one of the first aspect or the possible implementations of the first aspect. The chip system may include a chip, or may include a chip and another discrete component.

A sixth aspect of this application provides a computer-readable storage medium. The computer-readable storage medium stores instructions (or computer-readable instructions, computer program instructions, a function program, or program code). When these instructions are run on a computing device, the computing device is enabled to perform the method in any one of the first aspect or the possible implementations of the first aspect. In a possible implementation, the computing device may be a computer device.

A seventh aspect of this application provides a computer program product. When instructions (or computer-readable instructions, computer program instructions, a function program, or program code) included in the computer program product are executed by a computing device, the method in any one of the first aspect or the possible implementations of the first aspect of embodiments of this application is implemented. In a possible implementation, the computing device may be a computer device.

The foregoing describes the method in embodiments of this application by using the first aspect and the implementations of the first aspect, and describes the apparatus in embodiments of this application by using the second aspect to the sixth aspect and the implementations of the second aspect to the sixth aspect. The following separately describes beneficial effects of the method and the apparatus in embodiments of this application.

According to the information processing method provided in this embodiment of this application, a visual cognition process can be performed on the obtained image, to obtain the first target semantic information. Different from a visual cognition process that is in the conventional technology and in which semantic information is directly obtained through learning from an image, based on the method in embodiments of this application, in a process of performing visual cognition on the obtained image, the first device first obtains a first feature map through learning from the image, where the first feature map is used to describe the first form of the target object. Then, the first device obtains the first target semantic information through learning from the first feature map. According to the method in embodiments of this application, the first feature map is obtained. This helps improve a perceptibility degree of a first visual cognition process, and facilitates adjustment or optimization of the first visual cognition process, thereby helping continuously optimize a visual system, and further improving accuracy of executing a visual task by a computer.

In a possible implementation, the first device obtains the first feature map from the image by using the feature extraction model trained by using the machine learning method, and obtains the first target semantic information from the first feature map by using the first semantic recognition model trained by using the machine learning method. In a possible implementation, a training process of the feature extraction model and a training process of the first semantic recognition model are independent of each other.

Because the training process of the feature extraction model and the training process of the first semantic recognition model are independent of each other, a possible beneficial effect that can be implemented by the solution in this embodiment of this application includes: The feature extraction model is optimized, which helps improve accuracy (for example, the first feature map can describe the first form more accurately) of the first feature map obtained from the feature extraction model; and the first semantic recognition model performs semantic recognition on the first feature map that has higher accuracy, which helps improve accuracy of the first target semantic information obtained from the first semantic recognition model.

Because the training process of the feature extraction model and the training process of the first semantic recognition model are independent of each other, another possible beneficial effect that can be implemented by the solution in this embodiment of this application includes: When accuracy of a visual cognition result is low, the feature extraction model or the first semantic recognition model may be optimized based on the first feature map, and an entire visual system does not need to be optimized. This helps reduce optimization costs of the visual system. For example, if the first feature map can accurately describe the first form, accuracy of a visual cognition result may be improved by optimizing the first semantic recognition model. If the first feature map cannot accurately describe the first form, accuracy of a visual cognition result may be improved by optimizing the feature extraction model. This helps improve accuracy of a visual cognition result without optimizing the entire visual system, thereby helping reduce optimization costs of the visual system.

Optionally, the first feature map obtained by the first device from the feature extraction model is information about a three-dimensional model. The three-dimensional model is a result of high-level visual processing, and can more accurately describe the first form of the target object. The first device inputs the information about the three-dimensional model into the first semantic recognition model. This helps reduce complexity of the first semantic recognition model, and improve accuracy of the first target semantic information output by the first semantic recognition model.

Optionally, after inputting the obtained image into the feature extraction model, the first device may further obtain, from the feature extraction model, a second feature map corresponding to the image. The first device may input the second feature map into a second semantic recognition model, to obtain, from the second semantic recognition model, second target semantic information corresponding to the second feature map. Compared with a plurality of visual cognition processes (refer to the foregoing related descriptions) associated with each other in which semantic information is directly obtained from images in the conventional technology, in embodiments of this application, the first device obtains, from the feature extraction model, the first feature map required by the first semantic recognition model and the second feature map required by the second semantic recognition model, thereby helping reduce a redundant process between a visual cognition process corresponding to the first target semantic information and a visual cognition process corresponding to the second target semantic information. Further, this helps save resources of the first device, and helps improve visual cognition performance of the first device.

Optionally, the first device may execute a first visual task based on the first target semantic information. The first visual cognition process and the first visual task are executed by a same device. This helps perform online feedback on the first visual cognition process based on an execution effect of the first visual task, and helps timely optimize the first visual cognition process.

Optionally, the first device may execute a second visual task based on the second target semantic information. The second visual cognition process and the second visual task are executed by a same device. This helps perform online feedback on the second visual cognition process based on an execution effect of the second visual task, and helps timely optimize the second visual cognition process.

Optionally, the image is from sensing information of a vehicle-mounted sensor. This helps a vehicle implement a visual cognition function, thereby helping the vehicle execute a visual task and improving intelligence of the vehicle.

Optionally, the sensor includes at least two types of sensors. This helps enrich visual cognition of the first device on the target object, thereby helping improve accuracy of obtained semantic information.

The foregoing analyzes beneficial effects of the method in embodiments of this application by using examples. The apparatuses provided in embodiments of this application may be configured to perform the methods in the foregoing corresponding embodiments. Therefore, for technical effects that can be achieved by the apparatus embodiments of this application, refer to the technical effects achieved by the foregoing corresponding method embodiments. Details are not described herein again.

15 16

Figures 2, 3:
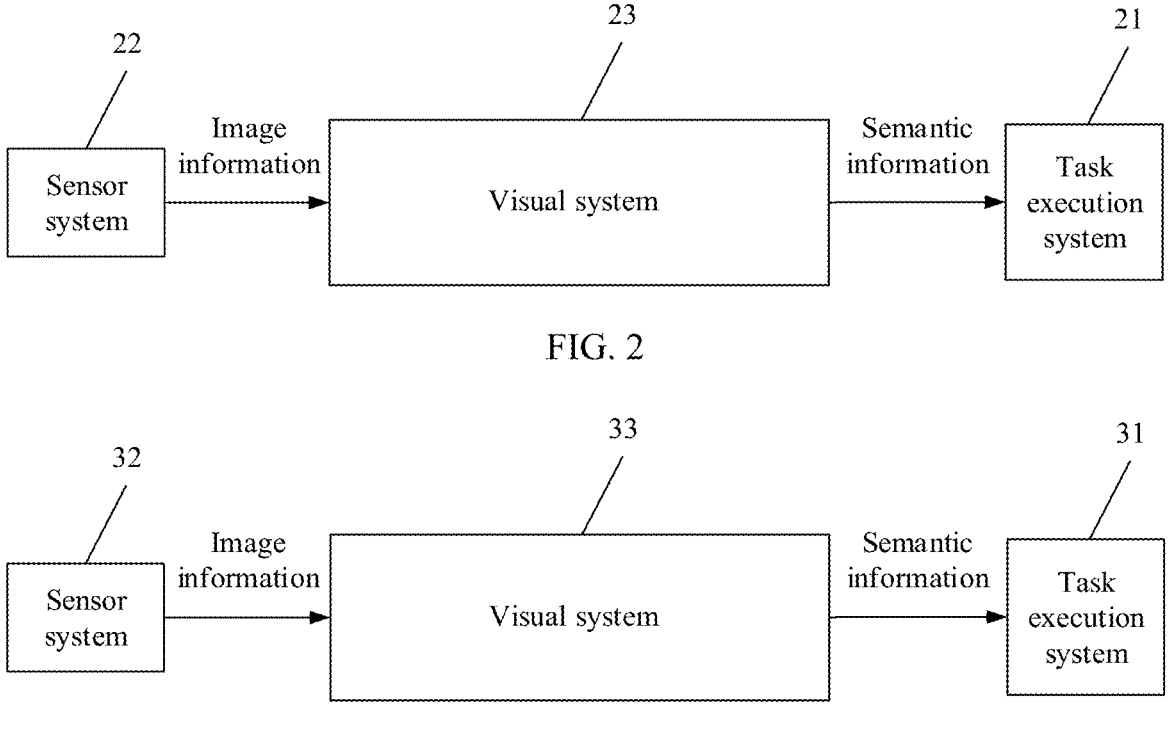
Figure 4:
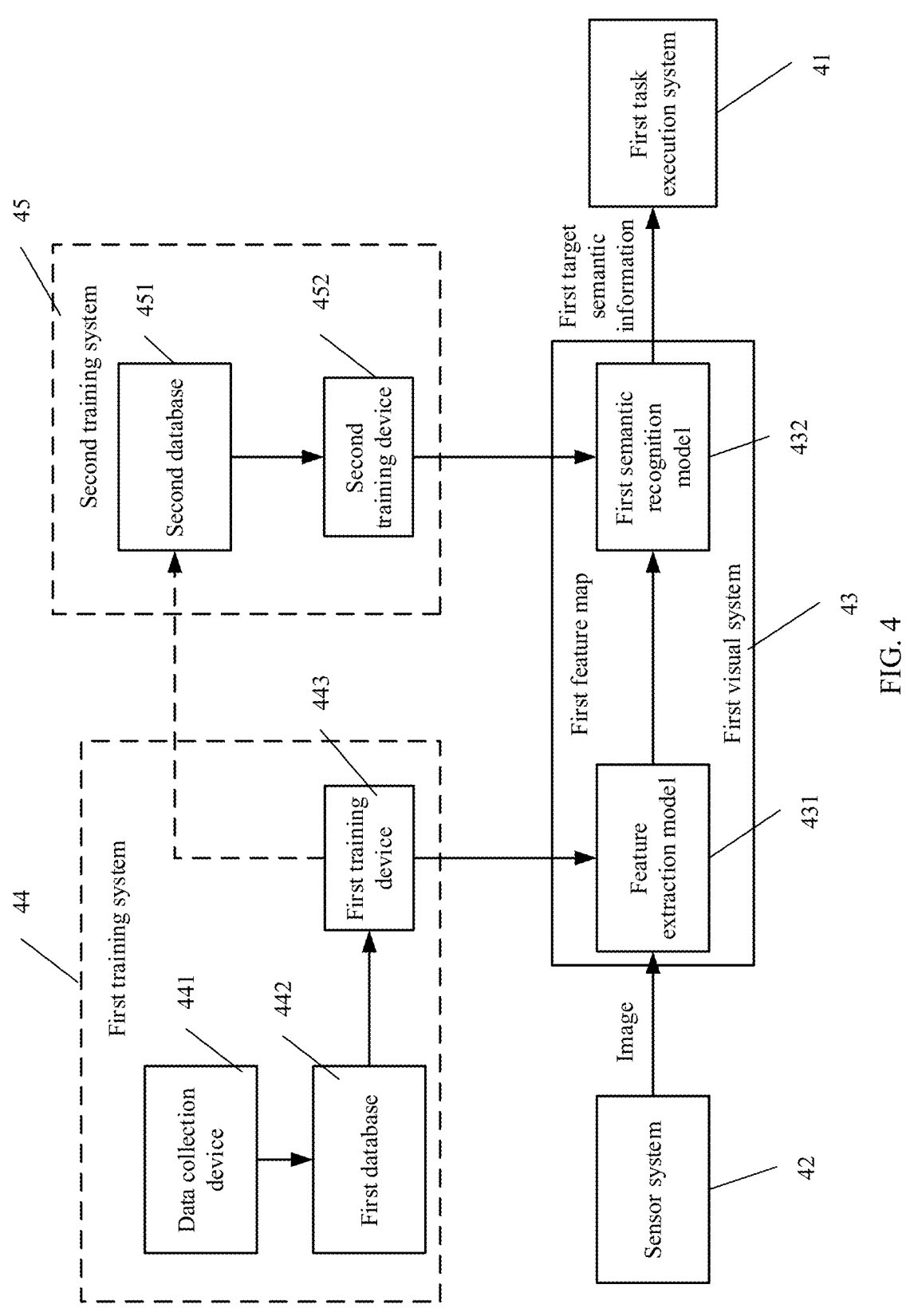
Figure 6A:
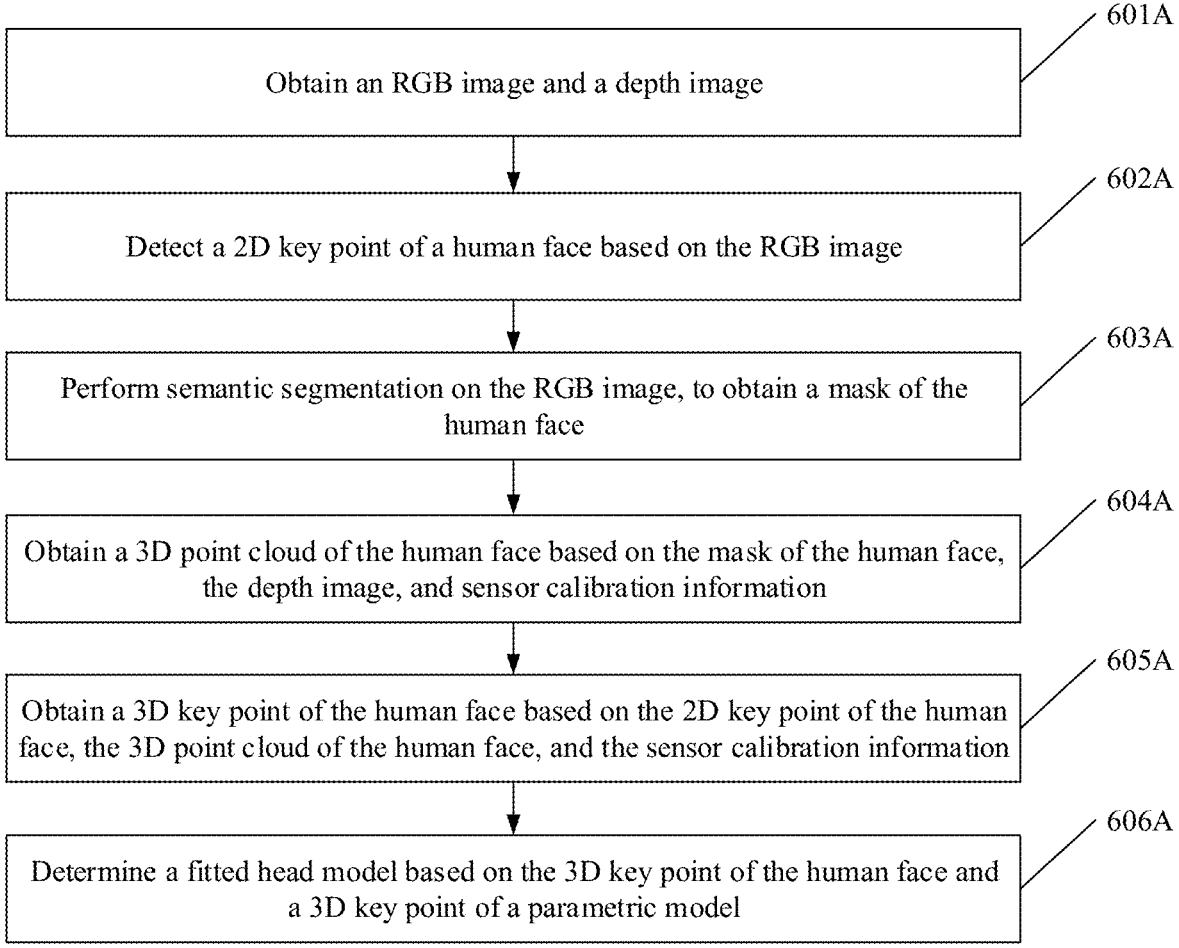
Figure 6B:
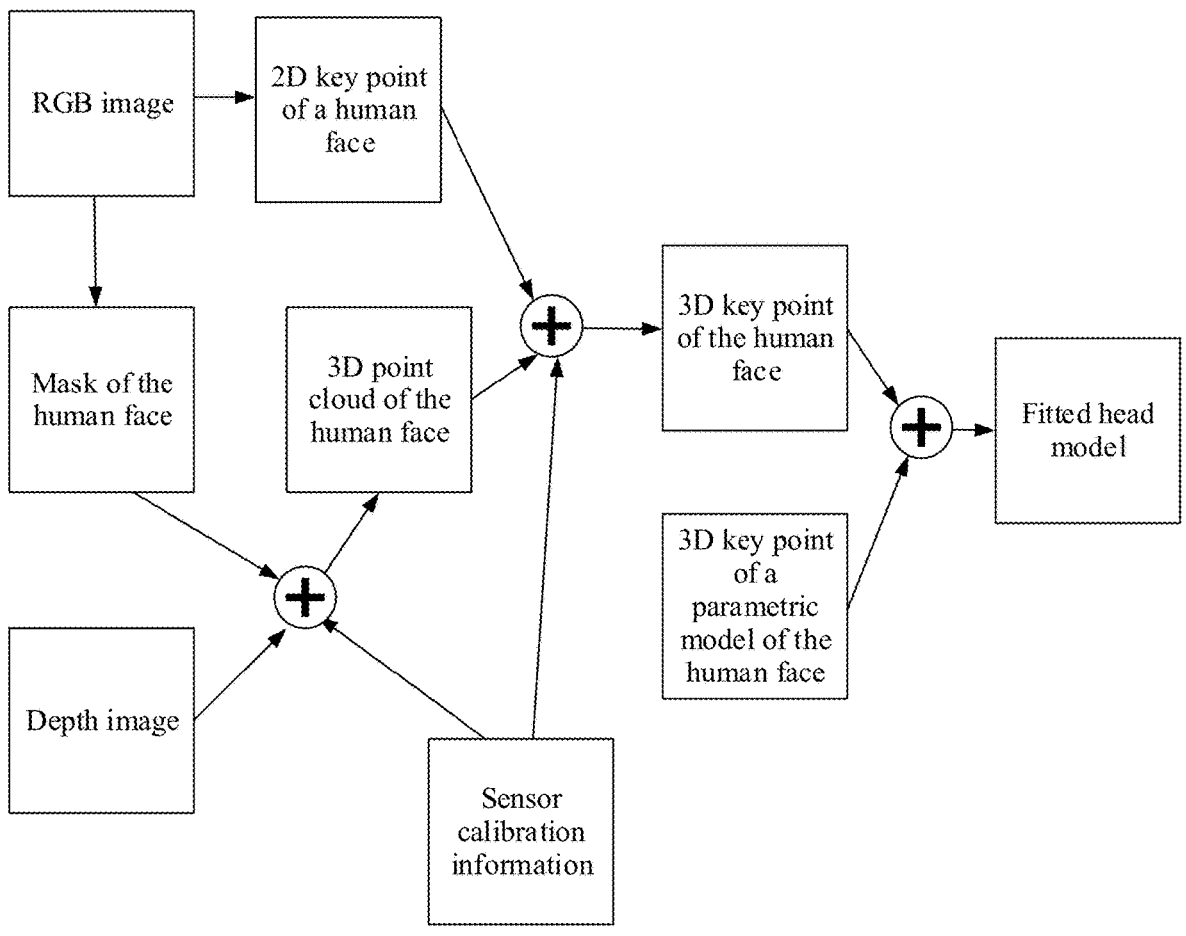
Figure 6D:
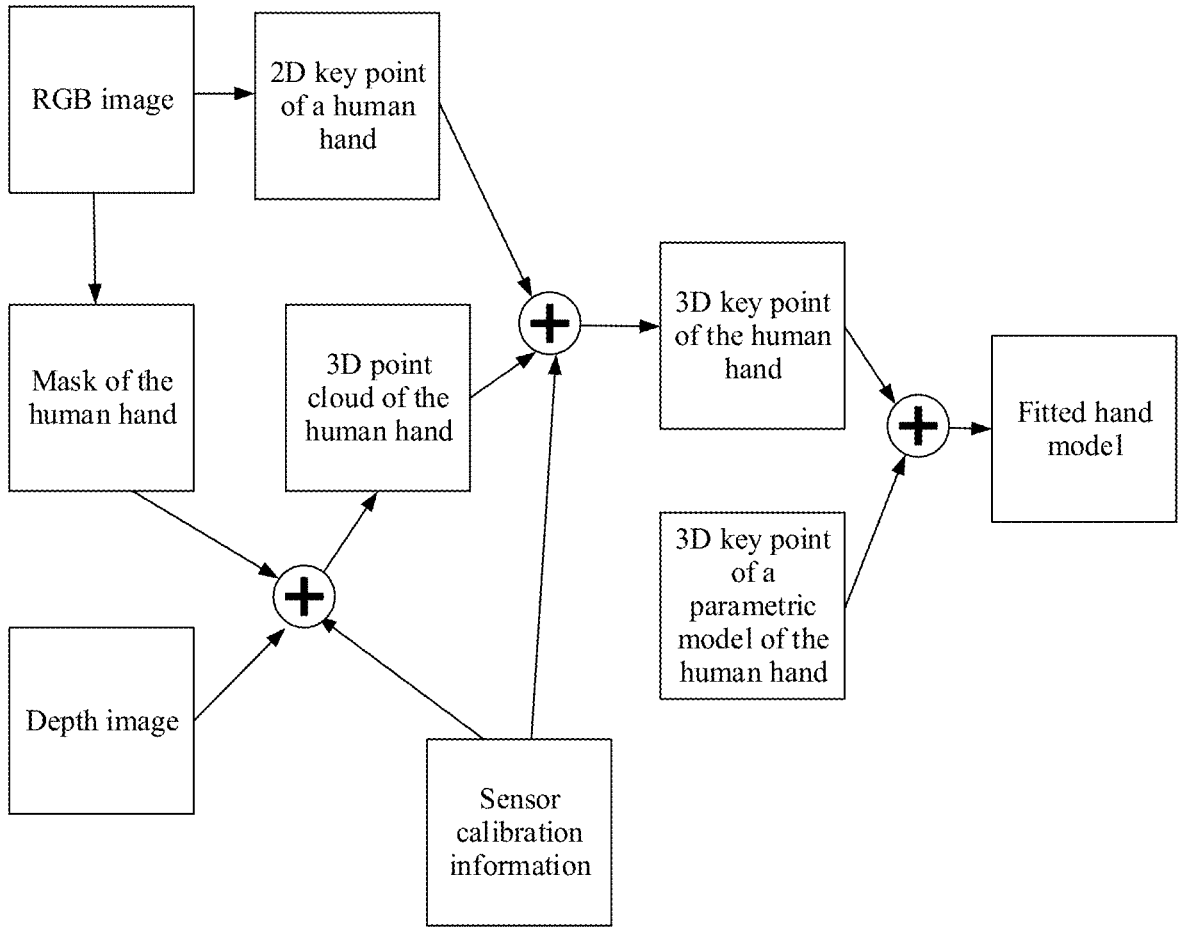
Figure 7A:
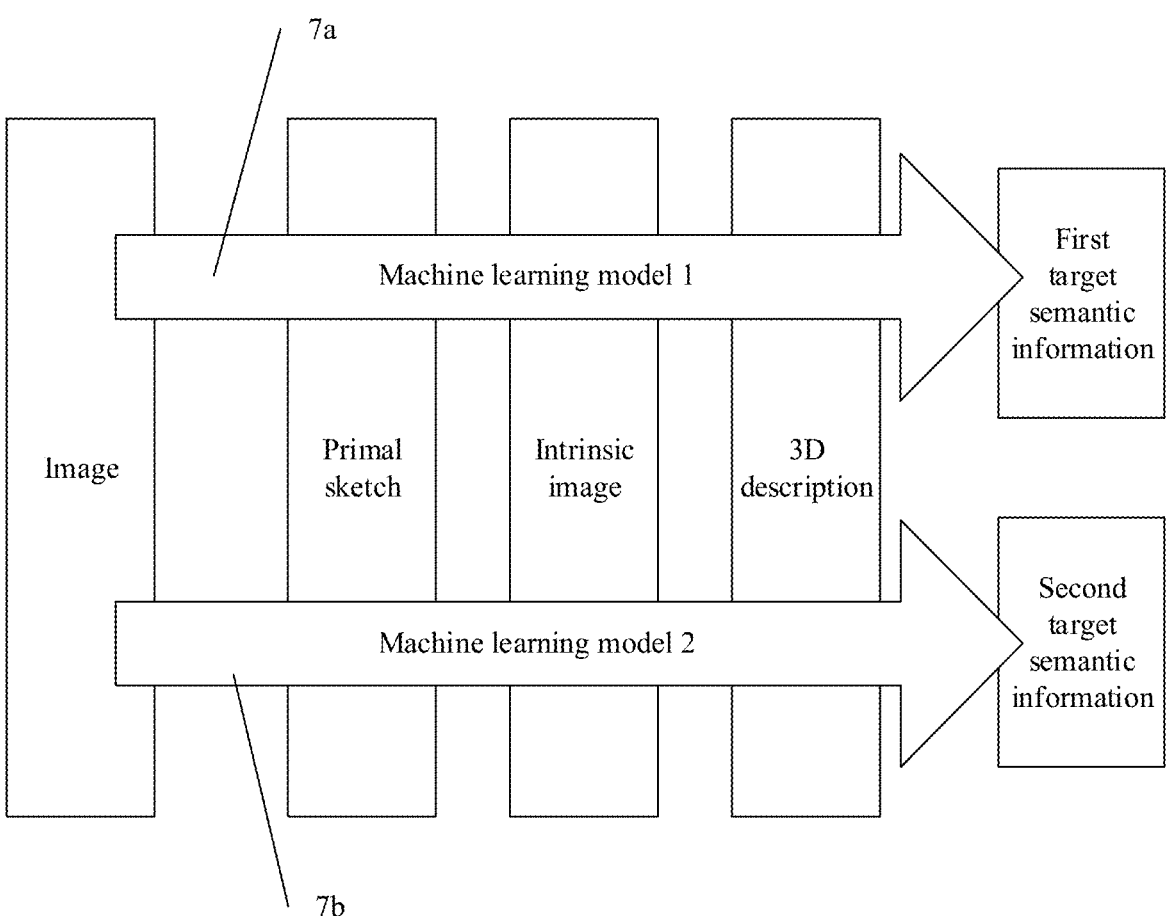
Figure 7B:
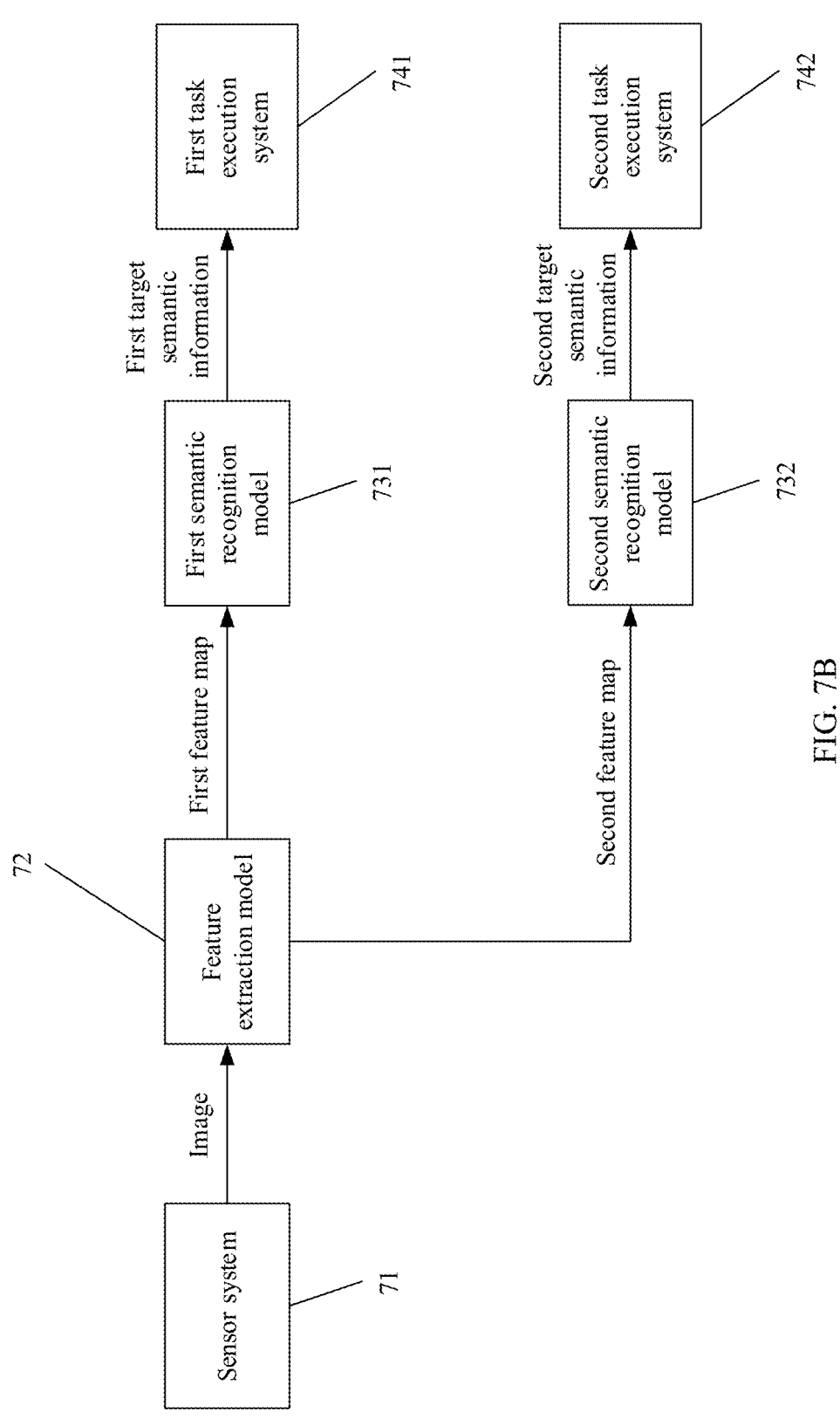
Figure 7C:
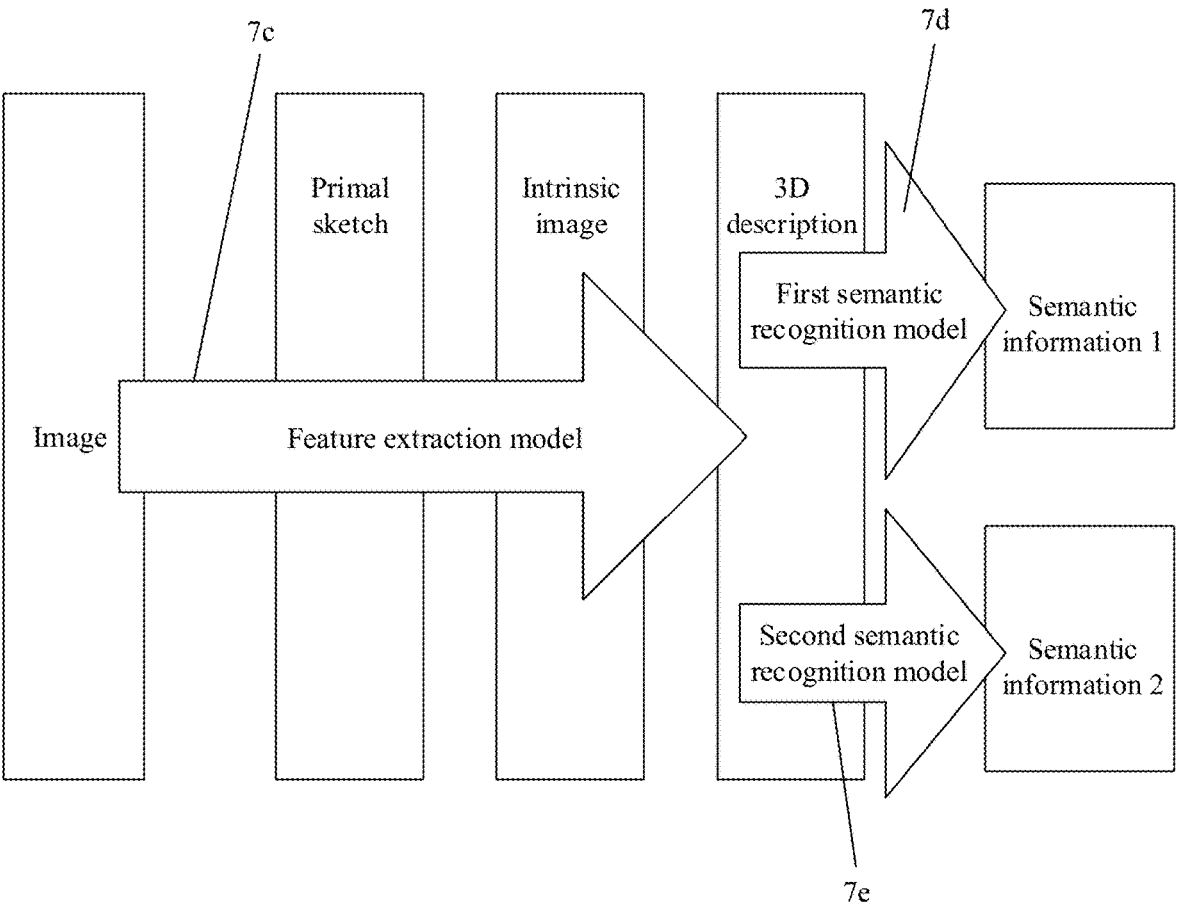
Figure 8:
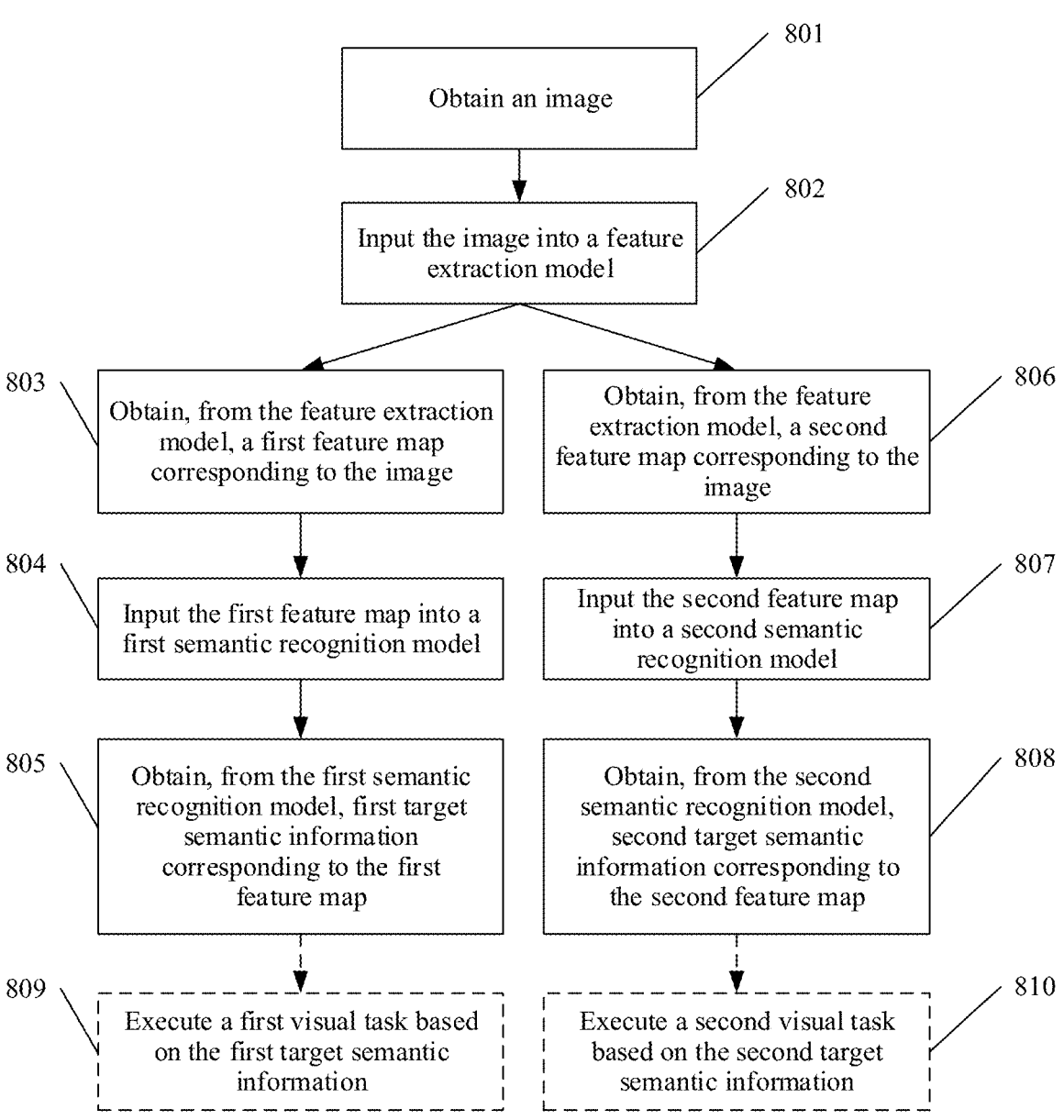
Figure 9:
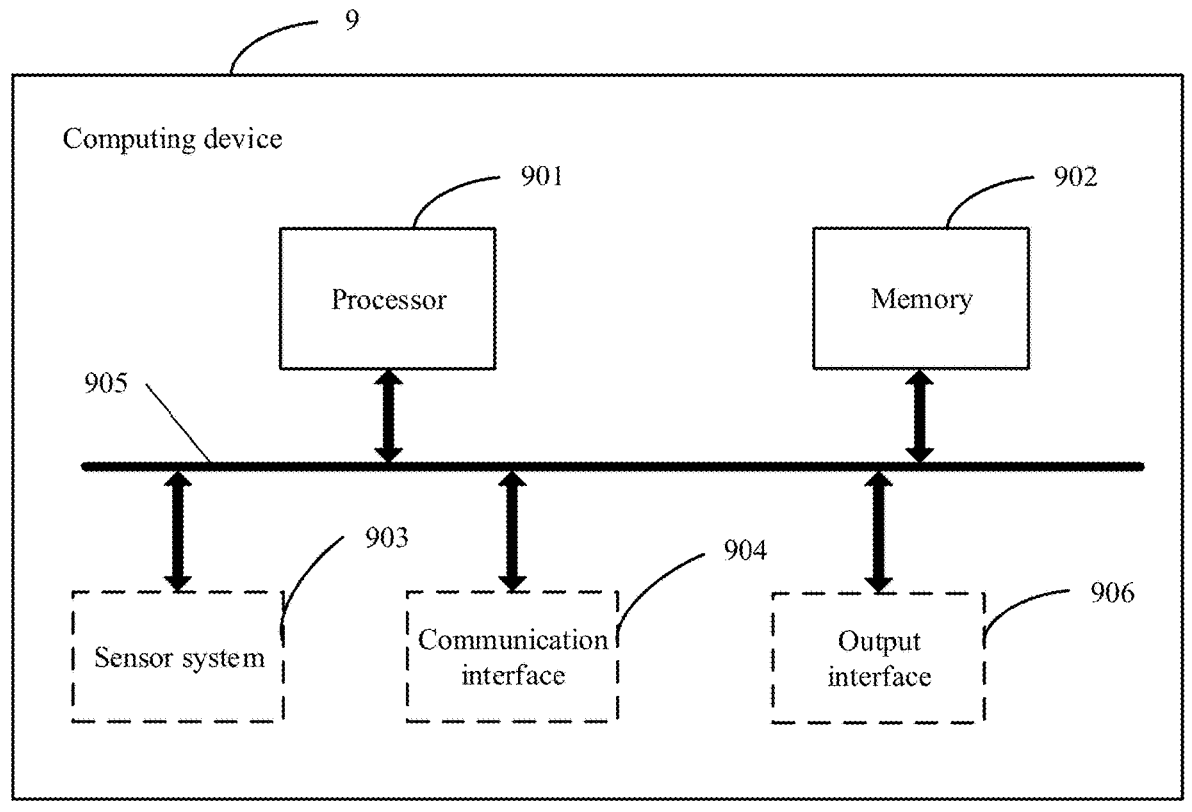
Figure 10:
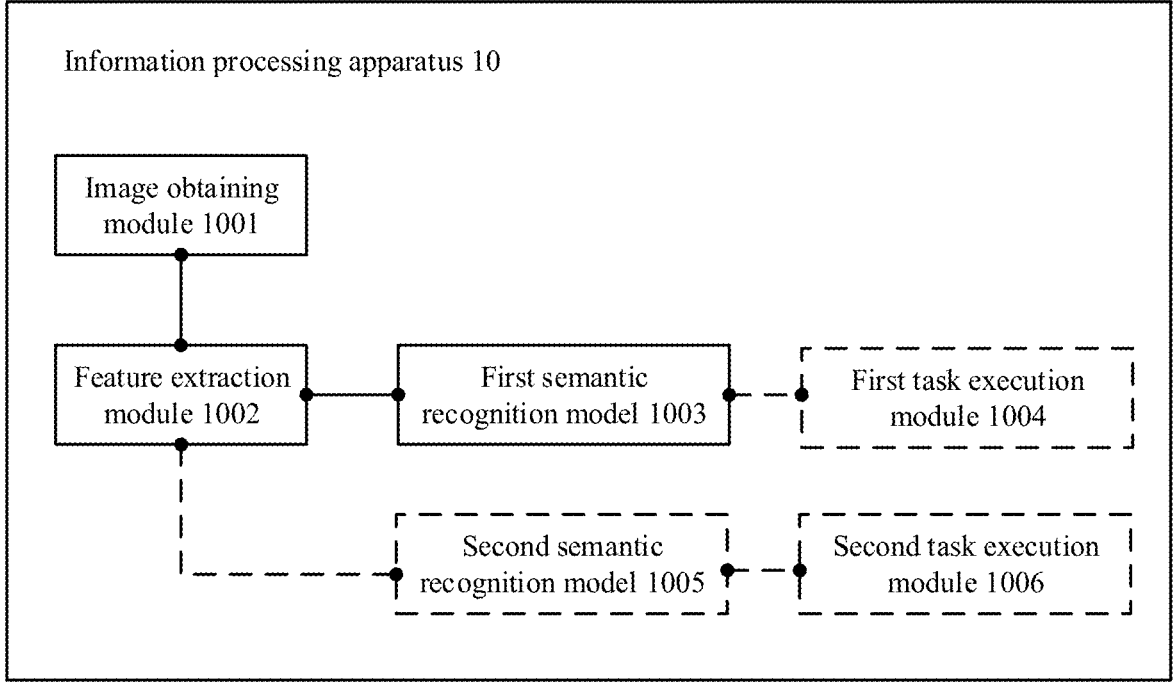

FIG. 2 shows a circuit structure for completing a safe driving supervision task;

FIG. 3 shows a circuit structure for completing a seat adjustment task;

FIG. 4 shows a possible circuit structure for completing a visual task according to an embodiment of this application;

FIG. 5A shows a possible step of an information processing method according to an embodiment of this application;

FIG. 5B, FIG. 5C, FIG. 5D, FIG. 5E, FIG. 5F, and FIG. 5G respectively show feature maps that may be obtained by using a feature extraction model according to this application;

FIG. 6A and FIG. 6B respectively show a possible feature extraction method according to an embodiment of this application;

FIG. 6C and FIG. 6D respectively show another possible feature extraction method according to an embodiment of this application;

FIG. 7A shows an information processing process performed to provide semantic information for two visual tasks in the conventional technology;

FIG. 7B shows another possible circuit structure for completing a visual task according to an embodiment of this application;

FIG. 7C shows an information processing process performed to provide semantic information for two visual tasks according to an embodiment of this application;

FIG. 8 shows another possible step of an information processing method according to an embodiment of this application;

FIG. 9 shows a possible structure of a computing device according to an embodiment of this application; and FIG. 10 shows a possible structure of an information processing apparatus according to an embodiment of this application.

DESCRIPTION OF EMBODIMENTS

The following first describes an application background in embodiments of this application.

Computer vision is an important branch in the field of artificial intelligence, and mainly means that a computer can replace a human eye and a brain to perform visual cognition (or referred to as visualized analysis) on an environment and a stimulus (or referred to as an object) in the environment. A result of the visual cognition may be semantic information. The semantic information is one of forms of information, and is meaningful information that can eliminate uncertainty of things. The semantic information may be understood and explained by using a natural language.

In embodiments of this application, semantic information of an image is information that can be presented by the image. A computer vision system may convert a pixel-level image into semantic information. For example, the semantic information may be a posture, a hand action, or the like of a person. The semantic information of the image may be applied to an intelligent device like a smart cockpit, to provide a reference for a visual task or the like executed by the intelligent device.

A visual task is a task executed based on a visual cognition result (namely, semantic information) of a target object, for example, a human-computer interaction task. The target object mentioned herein may correspond to a person or an object. In addition, that the target object corresponds to a complete person or object is not limited in this embodiment of this application. For example, the target object may be a part of a person, for example, a hand or a head of the person. For another example, the target object may be a part of an object, for example, a taillight or a license plate of a vehicle.

With reference to Table 1, the following uses a vehicle as an example to describe visual tasks executed by a computer and semantic information on which each visual task is based. It should be understood that, in addition to the field of intelligent vehicles, embodiments of this application may be further applied to another field like the field of intelligent terminals or the field of smart homes.

TABLE 1

| Visual task name | Target object | Semantic information | Visual task content |
|---|---|---|---|
| Safe driving supervision task | Head of a person | The driver is yawning; or the driver is not yawning. | When the driver is yawning, a voice "No drowsy driving!" is played. |
| Seat adjustment task | Head of a person | The driver is Zhang San; or the driver is not Zhang San. | When the driver is Zhang San, the driver's seat is adjusted based on seat parameters (front and rear positions, a tilt angle, a height, and the like) corresponding to Zhang San. |
| Vehicle startup task | Hand of a person | The driver makes an OK gesture; or the driver does not make an OK gesture. | When the driver makes the OK gesture, the engine of the vehicle is automatically started. |
| Gear switching task | Hand of a person | Number: For example, the driver selects the number 3. | When the driver makes a gesture indicating the number 3, the gear of the vehicle is set to 3. |
| Lane change reminder task | Vehicle | Location and driving status of the vehicle: For example, the vehicle on the front right side is to change a lane. | When the front vehicle is to change the lane, a voice reminder is sent. For example, a voice message "The vehicle on the front right side is to change the lane" is output. |
| Traffic signal light reminder task | Traffic signal light | The color of the traffic signal light is red, yellow, or green. | When the color of the traffic signal light is red, a voice "red light" is output. When the color of the traffic signal light is yellow, a voice "yellow light" is output. When the color of the traffic signal light is green, no voice is output. |

The following describes an example of a method for implementing a visual task.

A computer may execute, by using a task execution system, for example, the visual task shown in Table 1. Specifically, the task execution system is configured to: obtain semantic information expressed by a form of a target object, and execute the visual task based on the obtained semantic information. For example, the task execution system may preset a correspondence between semantic information and an action. After the semantic information is obtained, the correspondence indicating the semantic information is matched, and the action indicated by the correspondence is executed, to implement a visual task that needs to be executed.

Figure 1A:
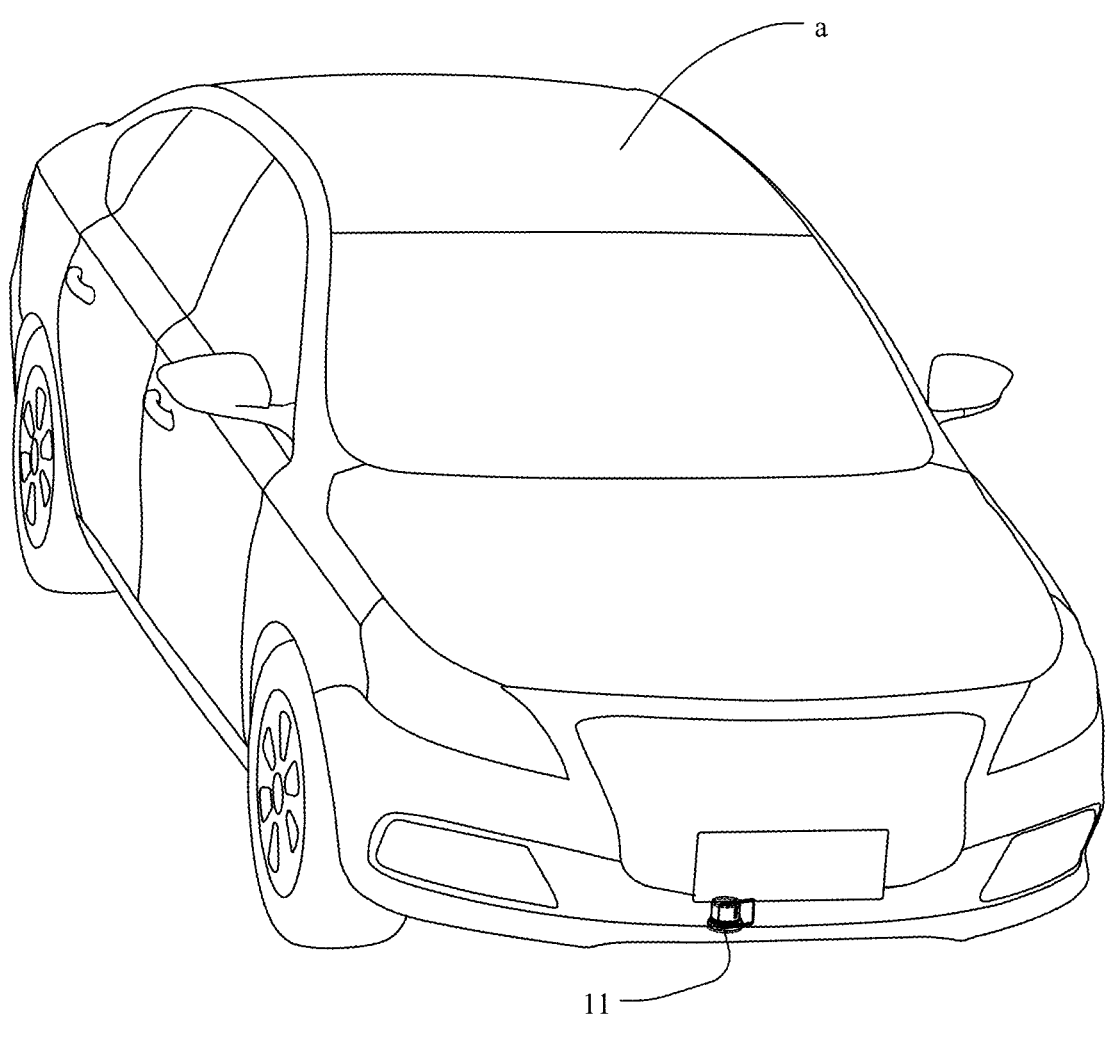
FIG. 1A shows a possible appearance of a vehicle.

For example, the computer is a vehicle a shown in FIG. 1A. It is assumed that the vehicle a executes the safe driving supervision task in Table 1 by using a task execution system 21 shown in FIG. 2. Optionally, the task execution system 21 presets a correspondence 1 and a correspondence 2. Semantic information indicated by the correspondence 1 is that a driver is yawning, and an action indicated by the correspondence 1 is to play a voice "No drowsy driving". Semantic information indicated by the correspondence 2 is that a driver is not yawning, and an action indicated by the correspondence 2 is to continue to obtain the semantic information.

For example, the computer is still the vehicle a shown in FIG. 1A. It is assumed that the vehicle a executes the seat adjustment task in Table 1 by using a task execution system 31 shown in FIG. 3. Optionally, the task execution system 31 presets a correspondence 3 and a correspondence 4. Semantic information indicated by the correspondence 3 is that the driver is Zhang San, and an action indicated by the correspondence 3 is to adjust a driver's seat based on seat parameters corresponding to Zhang San. Semantic information indicated by the correspondence 4 is that the driver is not Zhang San, and an action indicated by the correspondence 4 is not to adjust a driver's seat.

To enable the task execution system to correctly execute a visual task, for example, refer to the safe driving supervision task in Table 1, when the driver is yawning, the vehicle a plays the voice "No drowsy driving", the computer may obtain an image by using a sensor system, and perform visual cognition on the image by using a visual system, to output correct semantic information. The following describes the image obtaining and visual cognition processes by using an example, and defines "correct semantic information".

Figure 1B:
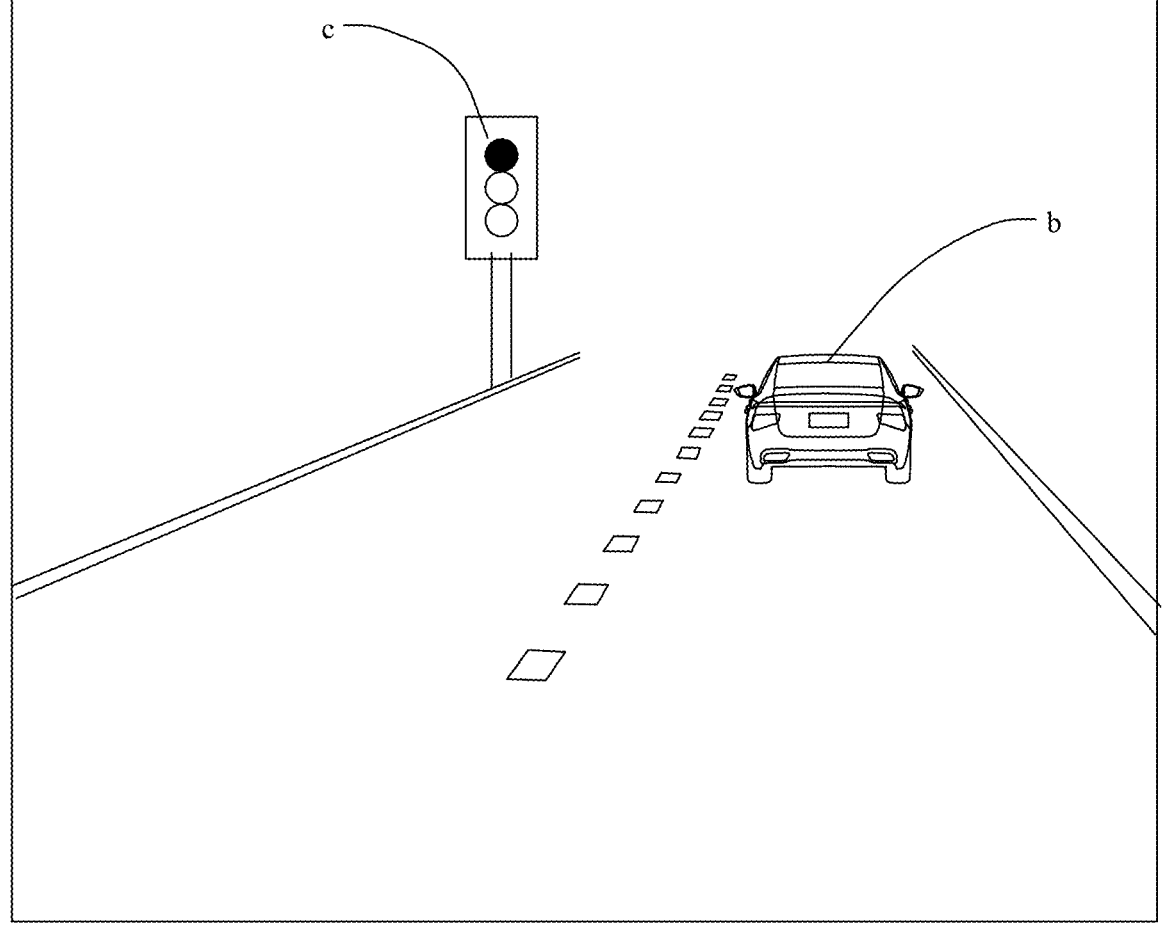
FIG. 1B shows a possible image that is obtained by the vehicle shown in FIG. 1A and that is of an object outside the vehicle.
Figure 1C:
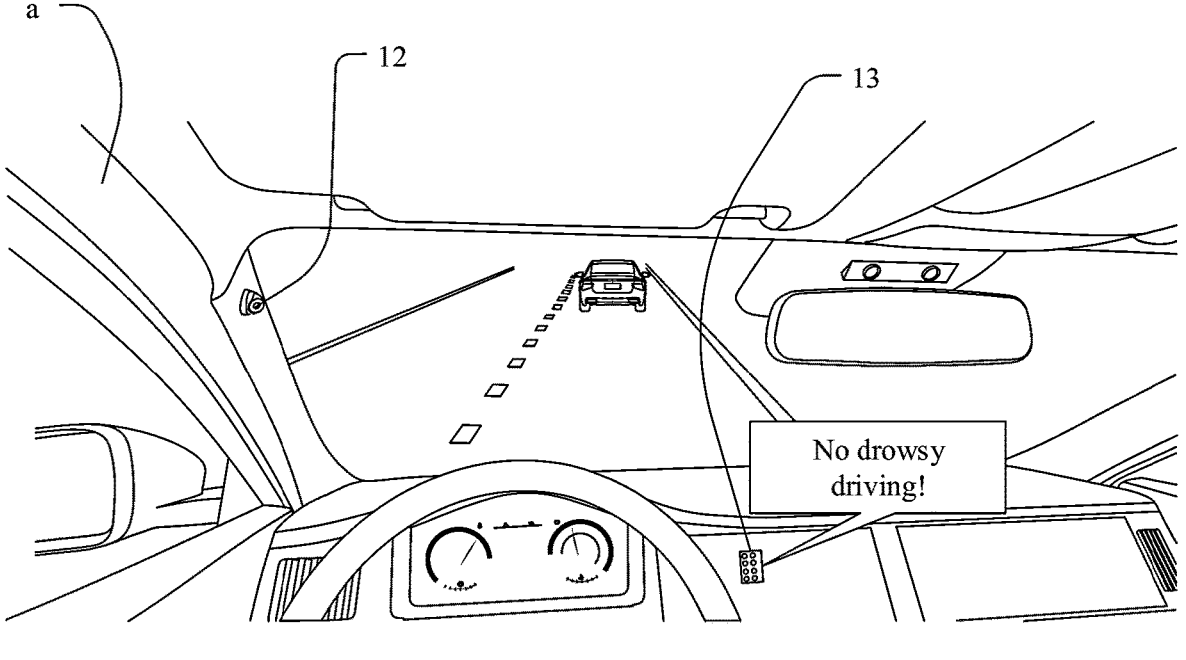
FIG. 1C depicts a partial appearance inside and outside a vehicle from a perspective of a driver.
Figure 1D:
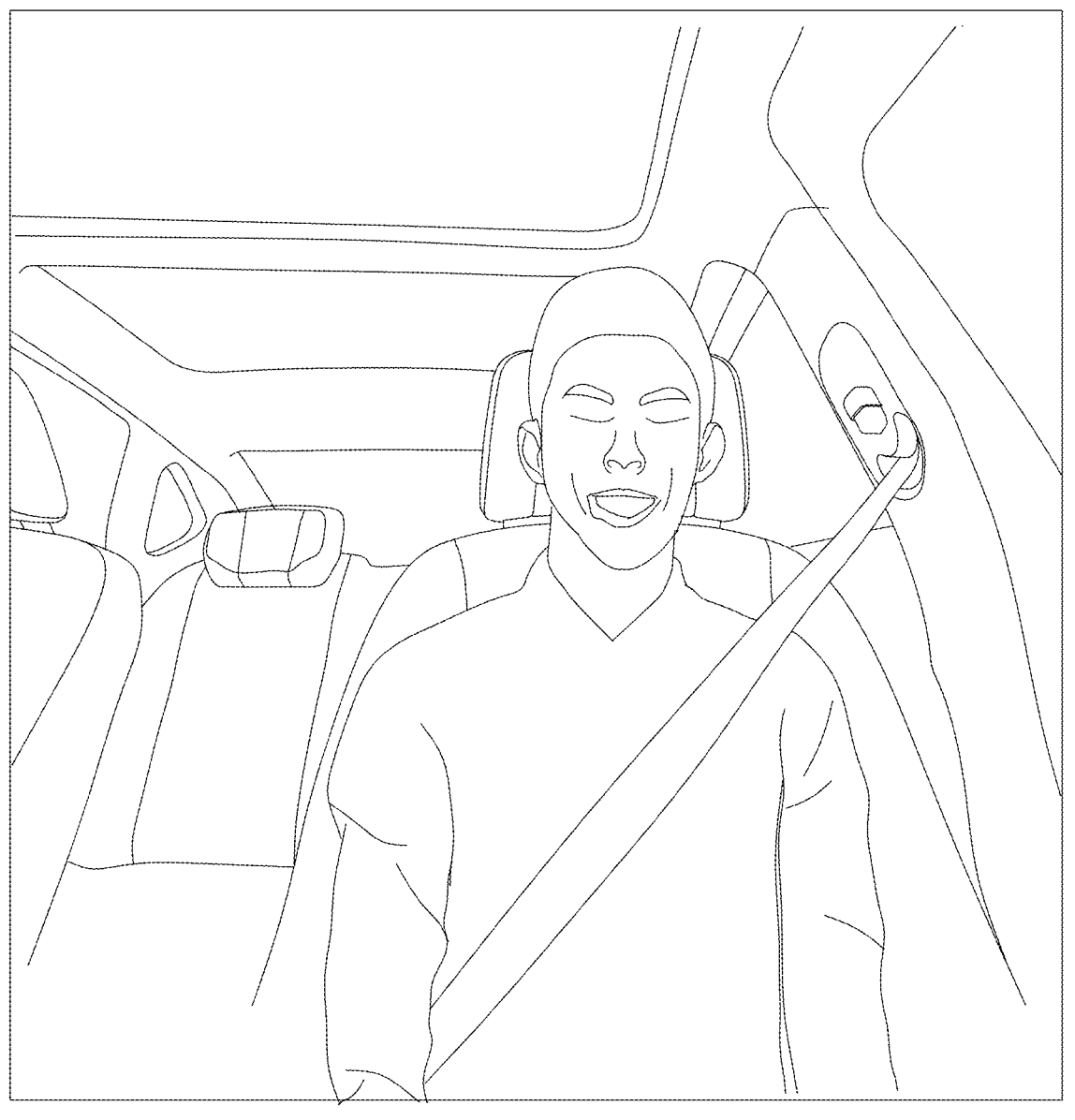
FIG. 1D shows a possible image that is obtained by the vehicle shown in FIG. 1A and that is of the interior of the vehicle.

The vehicle a shown in FIG. 1A is used as an example. The vehicle a can obtain an image by using a sensor system on the vehicle. For example, the vehicle a obtains an image in front of the vehicle a by using a camera 11 shown in FIG. 1A, as shown in FIG. 1B. In FIG. 1B, it is assumed that a left vehicle light of a vehicle b blinks, and a red light at a top of a traffic signal light c is on. For example, FIG. 1C depicts a partial appearance inside and outside the vehicle a from a perspective of the driver. As shown in FIG. 1C, the vehicle a can obtain an image inside the vehicle by using a camera 12 inside the vehicle a. The obtained image is shown in FIG. 1D. In FIG. 1D, the driver is Zhang San, and the driver is yawning.

Then, the visual system can obtain the image obtained by the sensor system, and after performing visual cognition on the image, output semantic information required by a visual task served by the visual system.

The safe driving supervision task in Table 1 is used as an example. It is assumed that a visual system 23 shown in FIG.

2 is configured to: obtain the image shown in FIG. 1D from a sensor system 22 (for example, the camera 12 in FIG. 1C), and output semantic information to the task execution system 21. The semantic information is, for example, that the driver is yawning. After obtaining the semantic information output by the visual system 23, the task execution system 21 shown in FIG. 2 may match, for example, the correspondence 1 described above, and then play, by using a loudspeaker 13 on the vehicle a, the voice "No drowsy driving", as shown in FIG. 1C.

The seat adjustment task in Table 1 is used as an example. It is assumed that a visual system 33 shown in FIG. 3 is configured to obtain the image shown in FIG. 1D from a sensor system 32 (for example, the camera 12 in FIG. 1C), and output semantic information to the task execution system 31. The semantic information is, for example, that the driver is Zhang San. After obtaining the semantic information output by the visual system 33, the task execution system 31 shown in FIG. 3 matches the correspondence 3, and further adjusts the driver's seat based on the seat parameters corresponding to Zhang San.

An implementation method of another visual task in Table 1 may be figured out by using the foregoing example. For example, to implement the lane change reminder task in Table 1, a visual system serving the task may obtain, for example, the image shown in FIG. 1B, perform visual cognition by using the vehicle b in the image as a target object, and output semantic information to a task execution system used to execute the visual task. Alternatively, to implement the traffic signal light reminder task in Table 1, a visual system serving the task may obtain, for example, the image shown in FIG. 1B, and perform visual cognition by using the traffic signal light c in the image as a target object, and output semantic information to a task execution system used to execute the visual task.

In a plurality of systems related to the foregoing visual task execution processes, the task executed by the visual system usually has the highest complexity. The following further describes the visual system.

The visual system is used to execute a visual cognition process, and the visual cognition process is generally implemented by using a machine learning model. The machine learning model is used to simulate visual cognition behavior of a human brain. Different people may have different visual cognition results for a same image, and a same person may also have different visual cognition results for a same image in different situations. For example, still based on the image shown in FIG. 1C, it is assumed that a plurality of persons (which are respectively referred to as A, B, and C) see FIG. 1D. A visual cognition result of A may be that the driver is yawning; a visual cognition result of B may be that the driver is Zhang San; and a visual cognition result of C may be that space inside the vehicle is large.

It can be learned that one image may express a plurality of types of semantic information, and each of the plurality of types of semantic information is generally related to one or more factors such as a target object selected in visual cognition and a visual cognition scenario. For a trained visual system, semantic information output by the visual system may be one of the plurality of types of semantic information, and the semantic information output by the visual system is correct.

In a possible implementation, a criterion for determining whether the semantic information is correct is determined based on an image obtained by the visual system and a visual task served by the visual system. Optionally, whether the semantic information output by the visual system is correct mainly depends on whether a task execution system can correctly execute a visual task after obtaining the semantic information. When a function of the task execution system is normal, if the task execution system can correctly execute the visual task after obtaining the semantic information, it may be considered that the semantic information output by the visual system is correct; otherwise, if the task execution system fails to correctly execute the visual task after obtaining the semantic information, it may be considered that the semantic information output by the visual system is incorrect.

In this embodiment of this application, correct semantic information is referred to as target semantic information. It is assumed that the image obtained by the visual system is shown in FIG. 1D, and the person in the image is Zhang San. In this case, for the visual system serving the safe driving supervision task shown in Table 1, the semantic information "The driver is not yawning" is the target semantic information; and for the visual system serving the seat adjustment task shown in Table 1, the semantic information "The driver is Zhang San" is the target semantic information.

In the plurality of systems related to the foregoing visual task implementation processes, the task executed by the visual system (for example, the visual system 23 corresponding to FIG. 2, or the visual system 33 corresponding to FIG. 3) has the highest complexity. In the conventional technology, a visual system usually directly obtains semantic information through learning from an obtained image. For example, an existing visual system is usually implemented by using a neural network, and the neural network is generally obtained through training by using a supervised deep learning method. A sample used in the training process is an image having a label, the image describes a form of a target object, and the label of the image is target semantic information determined by a user based on a visual task served by the visual system.

Because a task executed by the visual system has high complexity, the neural network is generally large and involves a large quantity of parameters. However, the existing visual system is implemented by using an end-to-end neural network, an entire visual cognition process is equivalent to a black box, and a training process of the visual system is difficult to perceive. Therefore, training costs of the existing visual system are high, development of computer vision is restricted, and a computer is hindered from executing a visual task.

To resolve the foregoing technical problem, an embodiment of this application provides an information processing method. The method may be applied to a first device. Based on the method, the first device can perform a visual cognition process on an obtained image. Different from an existing visual cognition process in which semantic information is directly obtained through learning from an image, in a process of performing visual cognition on the obtained image, the first device first obtains a first feature map through learning from the image, where the first feature map is used to describe a first form of a target object. Then, the first device obtains first target semantic information through learning from the first feature map. This helps improve a perceptibility degree of a visual cognition process, and facilitates adjustment or optimization of the visual cognition process, thereby helping continuously optimize a visual system, and further improving accuracy of executing a visual task by a computer.

With reference to FIG. 4 and FIG. 5A, the following continues to describe the information processing method provided in this embodiment of this application. The first device is any device that can perform the method in this embodiment of this application. In this embodiment of this application, the first device is not limited to a physical device or a virtual device, and a form of the first device is not limited either. For example, the first device may be the vehicle a shown in FIG. 1A, an intelligent terminal (for example, a mobile phone), an intelligent robot, a chip, or the like. For ease of understanding, an example in which the first device is the vehicle a is used for description in this embodiment of this application.

It is considered that the first device may be configured to execute a plurality of visual tasks. For ease of differentiation, one of the plurality of visual tasks is referred to as a first visual task, and a circuit structure used to execute the first visual task is shown in FIG. 4. Target semantic information that needs to be output by a first visual system 43 serving the first visual task is referred to as first target semantic information. Similar to the circuit structure shown in FIG. 2 or FIG. 3, a sensor system 42, the first visual system 43, and a first task execution system 41 in FIG. 4 may be understood with reference to related descriptions of the foregoing application background. Different from that in FIG. 2 or FIG. 3, the first visual system 43 shown in FIG. 4 includes at least a feature extraction model 431 and a first semantic recognition model 432. The following further describes the systems shown in FIG. 4 with reference to steps in the embodiment corresponding to FIG. 5A. The systems shown in FIG. 4 are not described in detail herein.

The following first describes in detail the information processing method in this embodiment of this application with reference to FIG. 4 and FIG. 5A. As shown in FIG. 5A, a possible embodiment of the information processing method in this application includes step 501 to step 505.

501: Obtain an image.

The first device may obtain the image. In a possible implementation, the image may be stored in a data format, for example, in a portable network graphics (PNG) format, a drawing exchange file (DXF) format, a joint photographic experts group (JPEG) format, or the like.

In a possible implementation, the image obtained by the first device is from sensing information of a sensor (for example, a vehicle-mounted sensor). For example, a type of the sensor includes at least one of a radar, a depth camera, a full-color camera, a fisheye camera, and an infrared detector. For example, the radar is a millimeter-wave radar. The millimeter-wave radar may be used to obtain a location of a target object and track a change, an image of sensing information from the millimeter-wave radar is point cloud data, the point cloud data describes information about a sampling point on the target object, and the information about the sampling point includes at least a location of the sampling point. For example, the depth camera may be a time of flight (TOF) camera. An image of sensing information from the TOF camera is a grayscale image, each pixel in the grayscale image carries depth information by using a pixel value, and the depth information represents time consumed for reflecting pulse light by a photographed object. For example, the full-color camera is a red green blue (RGB) camera. An image of sensing information from the RGB camera is an RGB image, each pixel in the RGB image carries RGB information by using a pixel value, and the RGB information represents a color of ambient light reflected by a photographed object.

The image obtained by the first device may be a single image, for example, the image shown in FIG. 1B or FIG. 1D. Alternatively, the image may be a plurality of images, for example, a plurality of consecutive video frames. When the image is the plurality of images, optionally, sensing information corresponding to the plurality of images may be obtained by a same sensor, or optionally, the plurality of images are respectively obtained by a plurality of sensors. Types of the plurality of sensors are the same. For example, all the sensors are radars. Alternatively, the plurality of sensors include at least two types of sensors. For example, the plurality of sensors include a depth camera and a full-color camera.

Optionally, the image is obtained after sensing information obtained by a vehicle-mounted sensor (the camera 11 shown in FIG. 1A, or the camera 12 shown in FIG. 1C) is preprocessed. In a possible implementation, the image may be obtained after the vehicle-mounted sensor preprocesses the sensing information. Alternatively, in a possible implementation, the image may be obtained after the first device preprocesses the sensing information. Alternatively, in a possible implementation, the image may be obtained after preprocessing by the vehicle-mounted sensor and then preprocessing by a processor of the first device. Optionally, preprocessing performed on the sensing information may include one or more of the following operations: digitization, geometric transformation, normalization, smoothing, denoising, restoration, splicing, enhancement, and the like. That the first device necessarily preprocesses the image is not limited in this embodiment of this application.

502: Input the image into a feature extraction model.

503: Obtain, from the feature extraction model, a first feature map corresponding to the image.

A feature extraction model 431 shown in FIG. 4 is preset in the vehicle a. The feature extraction model 431 is used to perform feature extraction on the input image, to obtain a feature map of the target object. A process of performing feature extraction on the image may be understood as a process of performing visual processing on the image. For example, the process includes one or more of the following processes: performing low-level visual processing on the input image, performing middle-level visual processing on the input image, and performing high-level visual processing on the input image. Correspondingly, the feature map obtained by the feature extraction model 431 includes, for example, an image obtained after corresponding visual processing is performed. For example, the feature map includes one or more of the following images: a primal sketch obtained through performing low-level visual processing on the input image, an intrinsic image obtained through performing middle-level visual processing on the input image, and a three-dimensional model obtained through performing high-level visual processing on the input image.

For example, it is assumed that the image input into the feature extraction model 431 is shown in FIG. 1D, and the target object is a head of a person. Optionally, the feature map obtained by the feature extraction model 431 may include the primal sketch. For example, the primal sketch may be a matte (or referred to as a mask) shown in FIG. 5B or a two-dimensional (2D) key point shown in FIG. 5C. Alternatively, optionally, the feature map obtained by the feature extraction model 431 may include the intrinsic image. For example, the intrinsic image may be a point cloud in a three-dimensional (3D) coordinate system shown in FIG. 5D, or a 3D key point in a 3D coordinate system shown in FIG. 5E. Alternatively, optionally, the feature map obtained by the feature extraction model 431 may include a 3D model (or referred to as a 3D model representation), for example, a head model of a person shown in FIG. 5F.

When the feature map is compared with the semantic information, optionally, the feature map is used to describe a form of the target object, and the semantic information is used to describe a meaning expressed by the form of the target object. In a possible implementation, the feature map of the target object may be indicated as information about a point cloud on the target object. The point cloud is a set of a plurality of points. The information about the point cloud includes information about each point in the set. Optionally, the information about each point includes at least location information of the point, and may further include brightness, an RGB value, or the like of the point. The location information of the point may be coordinates in a 2D coordinate system or coordinates in a 3D coordinate system. For example, all feature maps shown in FIG. 5B to FIG. 5F can indicate information about a point cloud on a head. However, semantic information (for example, a driver is yawning) cannot indicate information about the point cloud on the head. Alternatively, in a possible implementation, the feature map of the target object may be a feature parameter used to determine a point cloud on the target object. For example, the feature map of the target object may be a model parameter of a parametric model. Based on the model parameter and the parametric model, the 3D model shown in FIG. 5F may be determined.

When the feature map obtained by the feature extraction model 431 is compared with the image of the feature extraction model 431, optionally, a quantity of points in a point cloud corresponding to the feature map may be less than a quantity of points in a point cloud corresponding to the input image. For example, a quantity of points in a point cloud corresponding to the primal sketch or the intrinsic image may be less than the quantity of points in the point cloud corresponding to the input image. Alternatively, optionally, a quantity of points in a point cloud corresponding to the feature map may be greater than the quantity of points in the point cloud corresponding to the input image. For example, a quantity of points in a point cloud corresponding to the three-dimensional model may be greater than the quantity of points in the point cloud corresponding to the input image.

The feature extraction model 431 may obtain one or more feature maps, and there is a first feature map in the one or more feature maps. The following describes a feature of the first feature map. Optionally, after the first feature map is input into the first semantic recognition model 432 shown in FIG. 4, the first semantic recognition model 432 can output first target semantic information. In a possible implementation, the first feature map is a feature map obtained based on semantic segmentation performed on the target object in the input image, for example, FIG. 5B to FIG. 5F. Alternatively, optionally, the first feature map can describe the first form of the target object. That the first form is all forms described by the input image is not limited in this embodiment of this application. However, the first form can express at least the first target semantic information. The following describes the first form by using an example.

Figure 5B:
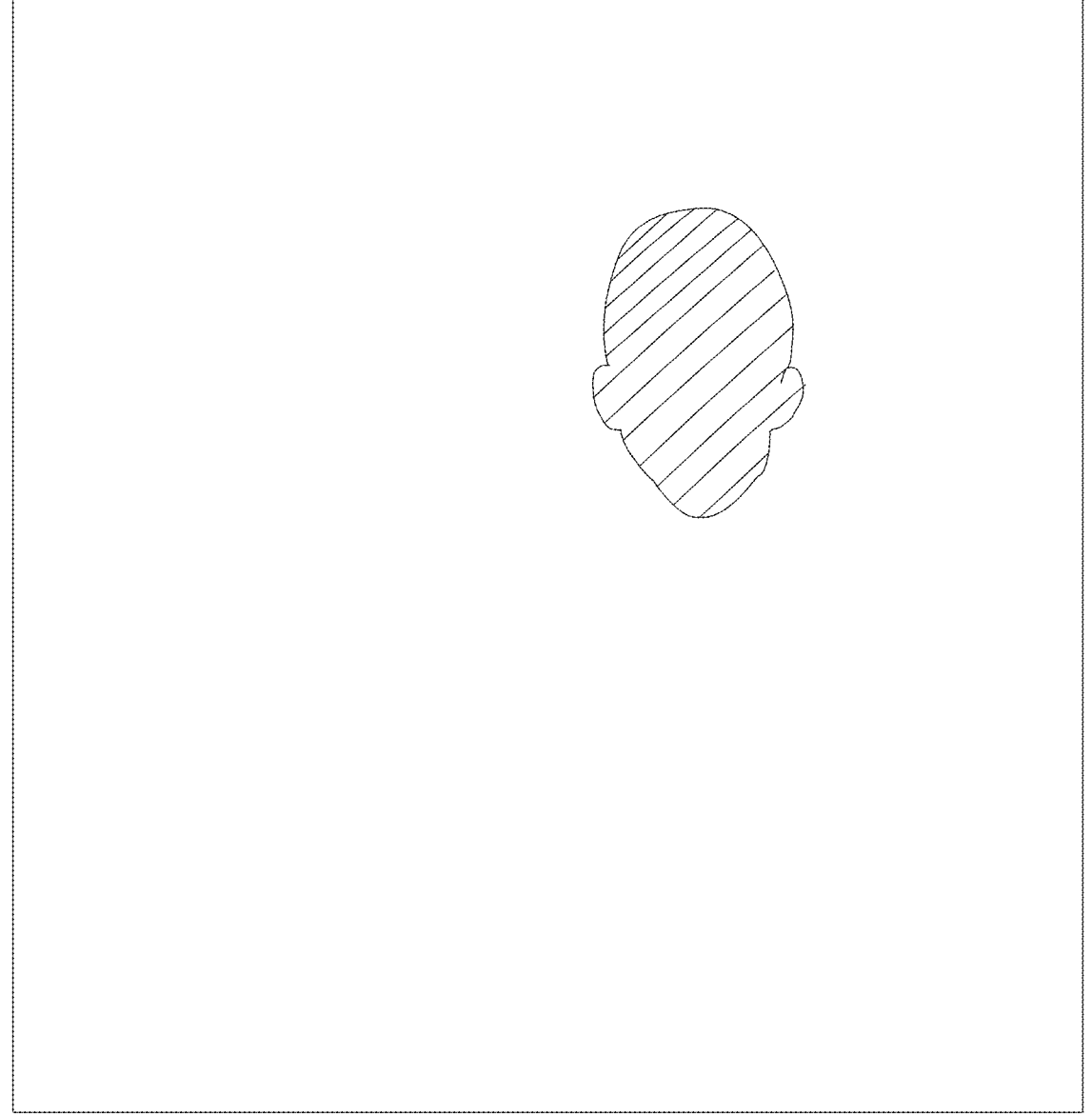

It is assumed that the first visual task is the safe driving supervision task in Table 1, and the feature extraction model 431 obtains the image shown in FIG. 1D. In this case, the first target semantic information is that the driver is yawning. The first form needs to be able to express the semantic information. It is assumed that after obtaining the image shown in FIG. 1D, the feature extraction model 431 extracts five feature maps shown in FIG. 5B to FIG. 5F. FIG. 5B describes an edge contour of the head of the person, but does not describe a feature within the edge contour. For example, FIG. 5B does not describe five sense organs of the person. Therefore, a form of the head of the person described in FIG.

Figure 5C:
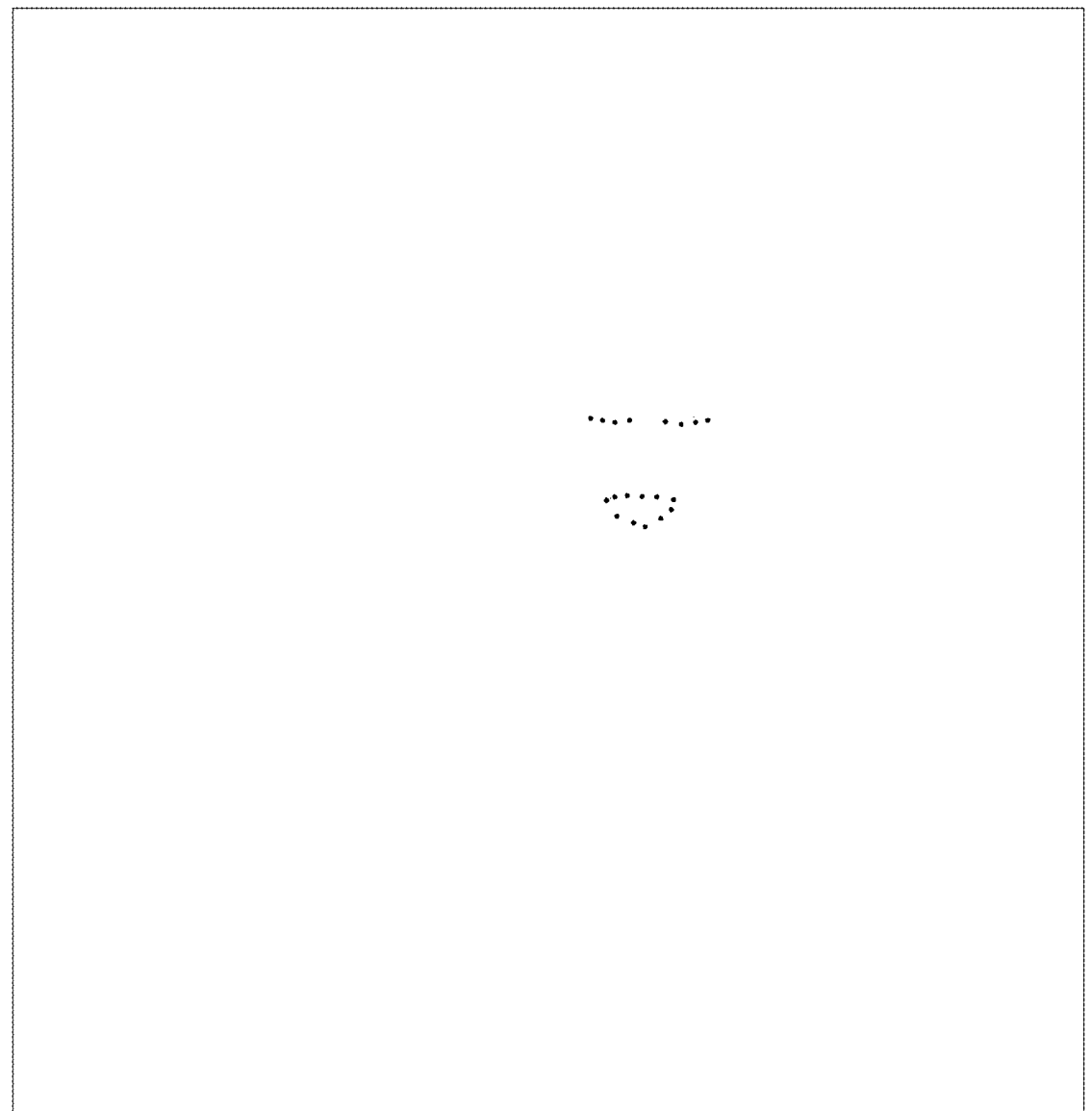
Figure 5D:
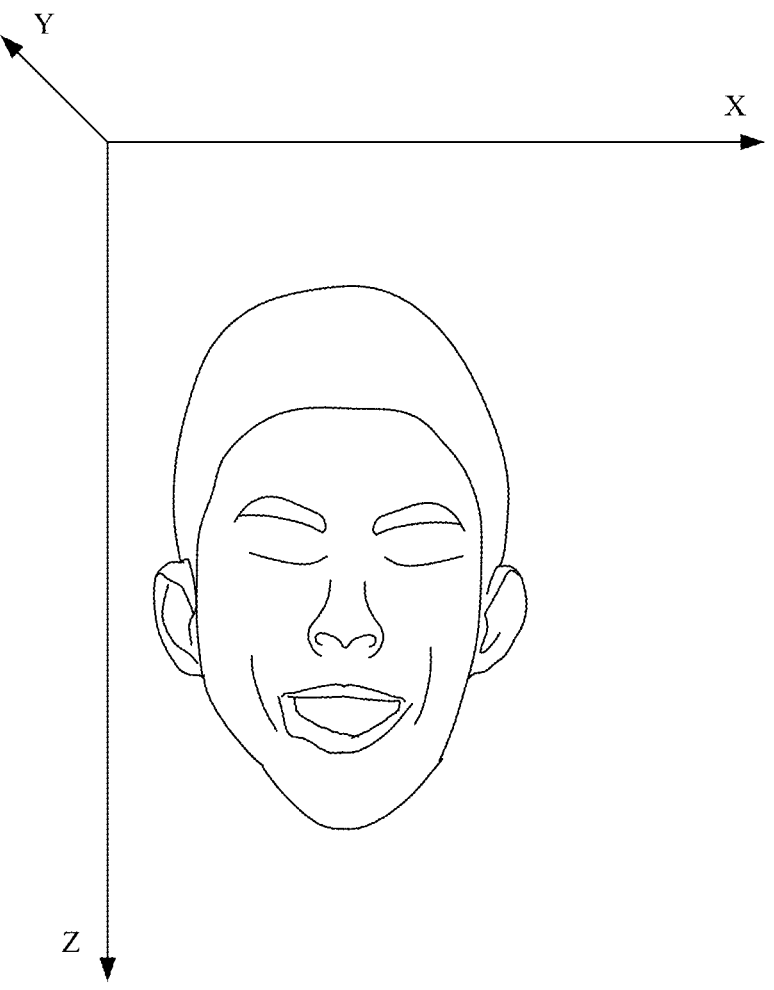
Figure 5E:
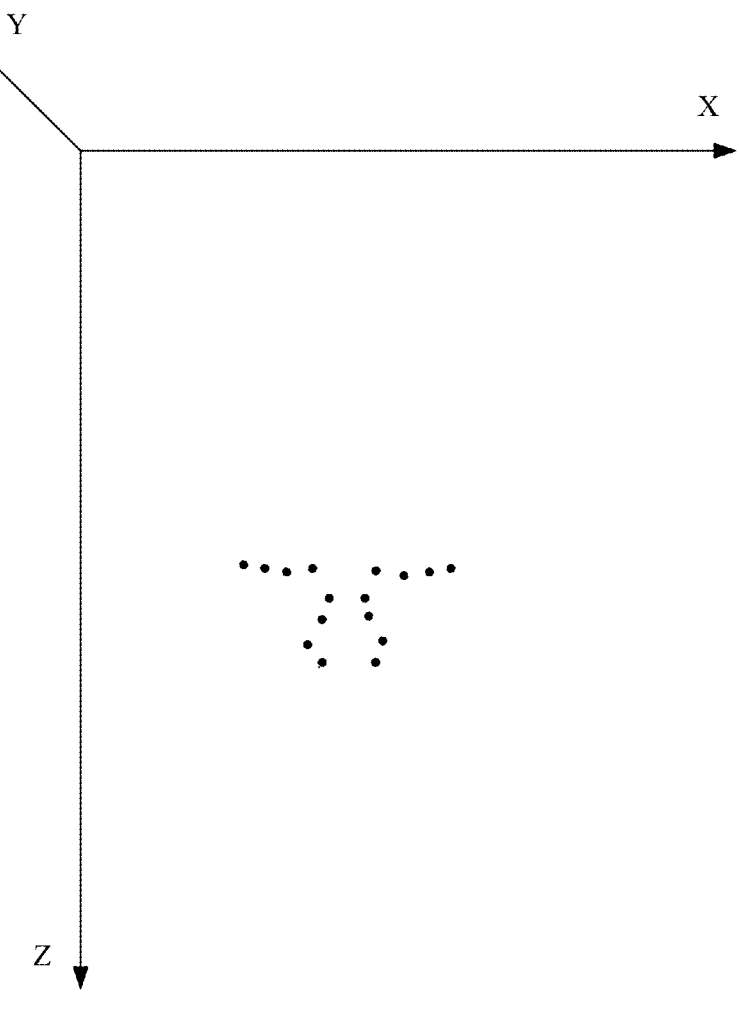
Figure 5F:
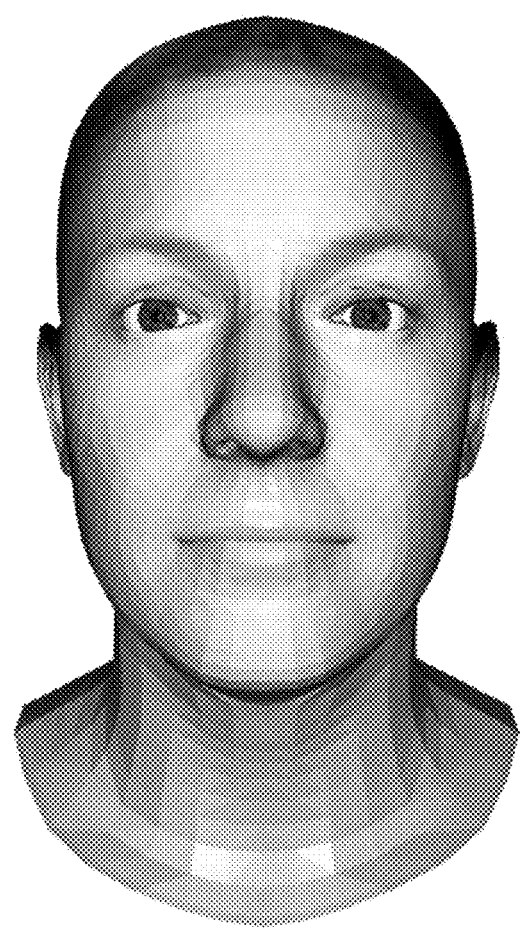

5B cannot express the first target semantic information (that is, the driver is yawning). FIG. 5E describes only forms of eyes and a nose of the person, and does not describe a mouth of the person. Therefore, a form of the head of the person described in FIG. 5E cannot express the first target semantic information (that is, the driver is yawning) either. FIG. 5C, FIG. 5D, and FIG. 5F all describe forms of the eyes and the mouth of the person. Forms of the head of the person described in FIG. 5C, FIG. 5D, and FIG. 5F can express the first target semantic information (that is, the driver is yawning). Therefore, one or more feature maps in FIG. 5C, FIG. 5D, and FIG. 5F may be selected as the first feature map.

It is assumed that the first visual task is the seat adjustment task in Table 1, and the feature extraction model 431 obtains the image shown in FIG. 1D. In this case, the first target semantic information is that the driver is Zhang San. The first form needs to be able to express the semantic information. It is assumed that after obtaining the image shown in FIG. 1D, the feature extraction model 431 extracts five feature maps shown in FIG. 5B to FIG. 5F. None of the forms of the head of the person described in FIG. 5B, FIG. 5C, and FIG. 5E can express the first target semantic information (that is, the driver is Zhang San). However, the forms of the head of the person described in FIG. 5D and FIG. 5F can express the first target semantic information (that is, the driver is Zhang San). Therefore, FIG. 5D and/or FIG. 5F may be selected as the first feature map.

For a considered factor for selecting the first feature map, in addition to considering whether the form described by the selected first feature map can express the first target semantic information, in a possible implementation, impact of the selected first feature map on complexity of the visual system and accuracy of the visual system may be further considered. Optionally, the selected first feature map not only helps reduce complexity of the visual system 43, but also helps improve accuracy of semantic information output by the visual system 43.

Figure 5G:
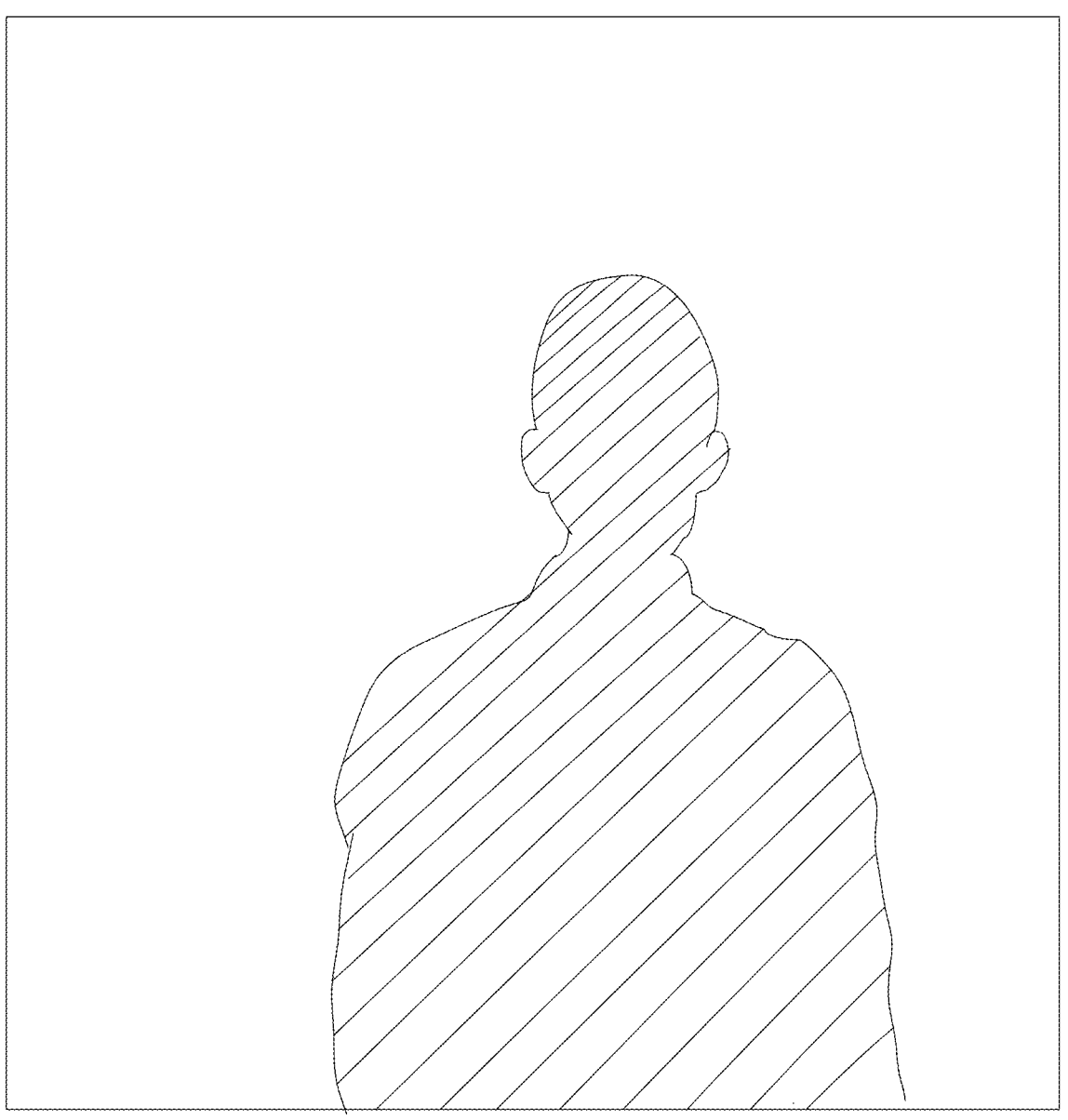

The safe driving supervision task in Table 1 is still used as an example. The form described in any feature map in FIG. 5C, FIG. 5D, and FIG. 5F can express the first target semantic information. For example, for a possible impact of each feature map on the visual system as the first feature map, refer to Table 2. In actual application, the first feature map may be selected based on Table 2.

the input image is shown in FIG. 1D, and the feature map obtained by the feature extraction model 431 may be shown in FIG. 5G. However, when the target object selected by the feature extraction model 431 is only the eyes or the hand of the person, the feature map of the target object obtained by the feature extraction model 431 cannot express the first target semantic information.

For a considered factor for selecting the target object, in addition to considering whether the form described by the selected target object can express the first target semantic information, in a possible implementation, impact of the selected target object on complexity of the visual system 43 and accuracy of the visual system 43 may be further considered. For example, the safe driving supervision task shown in Table 1 is still used as an example. Through comparison between a case in which all parts of the person are used as the target object and a case in which the head of the person is used as the target object, complexity of the visual system 43 is lower, and accuracy of the visual system 43 is slightly different. Therefore, for the feature extraction model 431 serving the safe driving supervision task, the head of the person may be selected as the target object, to reduce complexity of the visual system 43 and save computing resources.

For a specific process in which the feature extraction model 431 performs feature extraction on the image, further refer to related descriptions in the following (for example, embodiments corresponding to FIG. 6A to FIG. 6D). Details are not further described herein.

504: Input the first feature map into a first semantic recognition model.

505: Obtain, from the first semantic recognition model, first target semantic information corresponding to the first feature map.

The first semantic recognition model 432 shown in FIG. 4 is further preset in the vehicle a. The first semantic recognition model 432 is configured to determine the first semantic information based on the input feature map. The first semantic information describes a meaning expressed by a form of a target object, and the form is the form that is of

TABLE 2

| Types of considered factors | FIG. 5C Used as the first feature map | FIG. 5D Used as the first feature map | FIG. 5F Used as the first feature map |
|---|---|---|---|
| Complexity of the feature extraction model 431 | Low | Medium | High |
| Complexity of the first semantic recognition model 432 | High | Medium | Low |
| Accuracy of the first visual system 43 | Low | Medium | High |

The target object corresponding to each visual task shown in Table 1 is merely used as an example. In actual application, another object may be selected as the target object. For a considered factor for selecting the target object, first, it should be considered whether a form of the selected target object can express the first target semantic information. For example, the safe driving supervision task shown in Table 1 is used as an example. Alternatively, the target object corresponding to the feature extraction model 431 may be various parts of the person in the input image. For example, the target object and that is described by the input feature map. The first semantic information is used to execute the first visual task.

Optionally, compared with the image or the feature map, the first semantic information is no longer point cloud information of the target object, but is obtained through establishing a connection (or referred to as a semantic connection) between the feature map of the target object and a scenario in which the target object is located and a pre-learned concept, and is a result of visual cognition. For different visual tasks, different semantic information may be obtained based on a same form of the target object. Therefore, semantic recognition models serving different visual tasks may obtain different semantic information based on a same feature map.

For example, if the target object is a person or a part of a person, the first semantic information may indicate a posture, an action, a gesture, a line-of-sight partition, or the like of the person. For other descriptions of the first semantic information, refer to the foregoing descriptions of the semantic information. Details are not described herein again.

In this embodiment of this application, after obtaining the first feature map, the vehicle a may input the first feature map into the first semantic recognition model. In this embodiment of this application, after inputting the first feature map into the first semantic recognition model, the vehicle may obtain the first target semantic information output by the first semantic recognition model.

The first target semantic information is semantic information that is determined by the first semantic recognition model based on the input first feature map. The first target semantic information is used to describe a meaning expressed by the first form. Still refer to the safe driving supervision task in Table 1. It is assumed that the first feature map is the 3D model shown in FIG. 5F. The first target semantic information may be that the driver is yawning.

In a possible implementation, the vehicle a may further perform the following step 506.

506: Execute the first visual task based on the first target semantic information.

Optionally, after obtaining the first target semantic information, the vehicle a may execute the first visual task based on the first target semantic information. For example, as shown in FIG. 4, the vehicle a may input the first target semantic information into the first task execution system 41, and the first task execution system 41 executes the first visual task based on the first target semantic information. For example, the first task execution system 41 may preset a correspondence between semantic information and an action. After the first target semantic information is obtained, the correspondence indicating the first target semantic information is matched, and the action indicated by the correspondence is executed, to implement a visual task that needs to be executed. Optionally, for an example in which the first task execution system 41 executes the first visual task, refer to descriptions of the task execution system 21 or the task execution system 31 in the foregoing application background. Details are not described herein again.

Based on the method described in step 501 to step 505, in a process of performing visual cognition on the obtained image, the first device first obtains the first feature map through learning from the image, where the first feature map is used to describe the first form of the target object. Then, the first device obtains the first target semantic information through learning from the first feature map. Different from an existing visual cognition process in which semantic information is directly obtained through learning from an image, in the visual cognition process performed in this embodiment of this application, after the image is obtained and before the first target semantic information is obtained, the first feature map describing the first form can be obtained. This helps improve a perceptibility degree of the visual cognition process, and facilitates adjustment or optimization of the visual cognition process, thereby helping continuously optimize a visual system, and further improving accuracy of executing a visual task by a computer.

For example, it is assumed that the first target semantic information output by the first semantic recognition model 432 is not the first target semantic information corresponding to the input image, that is, the output semantic information is incorrect. In this case, maintenance personnel may quickly locate a problem by analyzing an output result of the feature extraction model 431. For example, if the image input into the feature extraction model 431 describes a head form of the driver when the driver is yawning, but the first target semantic information output by the first semantic recognition model 432 does not indicate that the driver is yawning, a problem may be located by analyzing whether the first feature map accurately describes the first form. If the first form described in the first feature map can express that the driver is yawning, the problem may be located in the first semantic recognition model 432. If the first form described in the first feature map cannot express that the driver is yawning, the problem may be located in the feature extraction model 431.

That the feature extraction model 431 corresponds to one machine learning model is not limited in this embodiment of this application. In a possible implementation, the feature extraction model 431 may correspond to two or more models obtained through training by using a machine learning method. In a possible implementation, the machine learning model corresponding to the feature extraction model 431 may be a neural network model. Alternatively, in a possible implementation, the feature extraction model 431 corresponds to one or more network layers in one neural network model.

Similarly, that the first semantic recognition model 432 corresponds to only one machine learning model is not limited in this embodiment of this application. In a possible implementation, the first semantic recognition model 432 may correspond to two or more models obtained through training by using a machine learning method. In a possible implementation, the machine learning model corresponding to the feature extraction model 431 may be a neural network model. Alternatively, in a possible implementation, the first semantic recognition model 432 corresponds to one or more network layers in one neural network model.

In a possible implementation, a training process of the feature extraction model 431 shown in FIG. 4 and a training process of the first semantic recognition model 432 are independent of each other. Still refer to FIG. 4. In FIG. 4, a first training system 44 is used to train the feature extraction model 431, and a second training system 45 is used to train the first semantic recognition model 432. Specifically, the feature extraction model 431 is obtained by a first training device 443 through training based on a sample in a first database 442, and the first semantic recognition model 432 is obtained by a second training device 452 through training based on a sample in a second database 451.

It should be noted that the training process of the feature extraction model 431 and the training process of the first semantic recognition model 432 are independent of each other. That the feature extraction model 431 and the first semantic recognition model 432 definitely correspond to different machine learning models is not limited. In a possible implementation, the feature extraction model 431 and the first semantic recognition model 432 may be integrated into a same machine learning model (for example, a neural network model).

The following describes the first training system 44.

The sample in the first database 442 is collected by a data collection device 441. The data collection device 441 is configured to obtain an image, and may be, for example, the sensor system 42 shown in FIG. 4.

Optionally, the feature extraction model 431 is obtained through online training. For example, still refer to FIG. 4. The first database 442 and the first training device 443 are disposed in the vehicle a. The vehicle a may train the feature extraction model 431 based on a collected image, and perform, by using the trained feature extraction model 431, the method embodiment corresponding to FIG. 4.

Alternatively, optionally, the feature extraction model 431 is obtained through offline training. For example, still refer to FIG. 4. The first database 442 and the first training device 443 are disposed in another device other than the vehicle a, for example, in a server used for model training. The server delivers the trained feature extraction model 431 (or a model parameter) to the vehicle a.

Optionally, a training standard of the first training device 443 may be as follows: For the first visual task, the semantic information expressed by the first feature map obtained by the feature extraction model 431 is target semantic information corresponding to a sample. For the training standard of the first training device 443, refer to the foregoing descriptions of the "correct semantic information" in the application background. Details are not described herein again.

The following describes the second training system 45.

The sample in the second database 451 is a feature map. In a possible implementation, as shown in FIG. 4, the sample in the second database 451 is from the first training device 443, and is a feature map generated by the feature extraction model 431 in a training process.

Optionally, the first semantic recognition model 432 is obtained through online training, or is obtained through offline training. For setting of a structure in the second training system 45 in the two scenarios, refer to the foregoing corresponding descriptions of the first training system 44. Details are not described herein again.

That the feature extraction model 431 can perform feature extraction on an image is described in the foregoing step 502 and step 503. The following describes an example of a feature extraction process.

To improve accuracy of semantic information, in a possible implementation, the feature extraction process includes a three-dimensional model reconstruction process. For example, the feature extraction model 431 may perform feature extraction on the image based on the following three phases.

Phase 1: A primal sketch representing a change and a structure in the image is obtained. The primal sketch includes processing such as detecting a grayscale change, representing and analyzing a partial geometric structure, and detecting a lighting effect.

Phase 2: A series of operations are performed on the primal sketch to obtain an intrinsic image that can reflect a geometric feature of a visible surface. The intrinsic image may alternatively be referred to as a two-dimensional half (2.5 Dimension, meaning a partial and incomplete three-dimensional information description) sketch. The intrinsic image removes much ambiguity from an original image, and purely represents features of an object surface. The features of the object surface include illumination, reflectivity, a direction, a distance, and the like. Based on the information represented by the intrinsic image, the image can be reliably divided into areas with clear meanings (this is referred to as segmentation), so that a description that is of a higher level than that of a line, an area, a shape, or the like can be obtained.

Phase 3: Further processing is performed on the intrinsic image, and a complete three-dimensional (3D) description of the object is formed based on prior knowledge related to an application field. For example, the feature extraction model fits the target object by using a parametric model, to obtain a model of the target object.

In a possible implementation, different target objects correspond to different parametric models, and a parametric model selected for the feature extraction model 431 is a parametric model corresponding to the target object. The following describes several common parametric models by using an example in which the target object is different parts of a human body. For example, if the target object is a torso of a person, the selected parametric model may be a skinned multi-person linear model (SMPL). The model is a linear differential human body model and generates, by using an 85-dimensional vector (hidden variable z), a human body mesh having 6023 vertices. For example, if the target object is a head of a person, the selected parametric model may be faces learned with an articulated model and expressions (FLAME). The FLAME is a facial expression parametric representation model, and a model obtained by using the parametric model may reflect a shape, an expression, a posture, and an appearance (or referred to as skin texture) of the head of the person. For example, if the target object is a hand of a person, the selected parametric model may be a hand model with articulated and non-rigid deformations (hand model with articulated and non-rigid deformations, MANO). The MANO is a hand model, can express rich and fine finger postures, and is applicable to recognizing a fingertip-level gesture.

The foregoing describes several parametric models of the human body. With reference to FIG. 6A to FIG. 6D, the following separately describes processes in which the feature extraction model 431 reconstructs a head model and a hand model of a person by using a parametric model.

As shown in FIG. 6A and FIG. 6B, a method for reconstructing the head model of the person by the feature extraction model 431 includes step 601A to step 606A.

601A: Obtain an RGB image and a depth image.

For understanding of the RGB image, refer to the image shown in FIG. 1B or FIG. 1D.

602A: Detect a 2D key point of a human face based on the RGB image.

For example, the feature extraction model may detect 68 key points of the human face based on the RGB image, and then select 51 two-dimensional (2D) key points of five sense organs from the 68 key points.

For understanding of the 2D key point, refer to the image shown in FIG. 5C.

603A: Perform semantic segmentation on the RGB image, to obtain a mask of the human face.

For understanding of the mask of the human face, refer to the image shown in FIG. 5B.

604A: Obtain a 3D point cloud of the human face based on the mask of the human face, the depth image, and sensor calibration information.

The RGB image and the depth image are respectively obtained by a full-color camera and a depth camera. The sensor calibration information is used to calibrate the full-color camera and the depth camera into a same three-dimensional coordinate system (referred to as a target coordinate system). For understanding of the 3D point cloud of the human face, refer to the image shown in FIG. 5D.

605A: Obtain a 3D key point of the human face based on the 2D key point of the human face, the 3D point cloud of the human face, and the sensor calibration information.

For understanding of the 3D key point of the human face, refer to the image shown in FIG. 5E.

606A: Determine a fitted head model based on the 3D key point of the human face and a 3D key point of the parametric model.

For understanding of the fitted head model, refer to the image shown in FIG. 5F.

For example, the feature extraction model 431 constructs a loss function by using a difference between the sampled 3D key point of the human face and the 3D key point of the parametric model, and minimizes a value of the loss function by adjusting a fitting parameter in the parametric model, to obtain the fitted head model. Then, a differential programming method may be used to optimize a model parameter and further fit the point cloud.

According to the head model obtained in the embodiment corresponding to FIG. 6A, an average error of 3D key points of the head model may be less than 2 millimeters, and an average error of grid vertices of the head model may be controlled within 3.3 millimeters. An accurate head model helps improve accuracy of recognizing semantic information of a head by a semantic recognition model.

As shown in FIG. 6C and FIG. 6D, a method for reconstructing the hand model of the person by the feature extraction model 431 includes step 601C to step 606C.

601C: Obtain an RGB image and a depth image.

602C: Detect a 2D key point of a human hand based on the RGB image.

603C: Perform semantic segmentation on the RGB image, to obtain a mask of the human hand.

604C: Obtain a 3D point cloud of the human hand based on the mask of the human hand, the depth image, and sensor calibration information.

The RGB image and the depth image are respectively obtained by a full-color camera and a depth camera. The sensor calibration information is used to calibrate the full-color camera and the depth camera into a same three-dimensional coordinate system (referred to as a target coordinate system).

605C: Obtain a 3D key point of the human hand based on the 2D key point of the human hand, information about the 3D point cloud of the human hand, and the sensor calibration information.

606C: Determine a fitted hand model based on the 3D key point of the human hand and a 3D key point of the parametric model.

For example, the feature extraction model 431 constructs a loss function by using a difference between the sampled 3D key point of the human hand and the 3D key point of the parametric model, and minimizes a value of the loss function by adjusting a fitting parameter in the parametric model, to obtain the fitted hand model. Then, a differential programming method may be used to optimize a model parameter and further fit the point cloud.

According to the hand model obtained in the embodiment corresponding to FIG. 6C and FIG. 6D, an average error of 3D key points of the hand model may be less than 3.7 millimeters, and an average error of grid vertices of the hand model may be controlled within 5.0 millimeters. An accurate hand model helps improve accuracy of recognizing semantic information of a hand by a semantic recognition model.

With reference to FIG. 6A to FIG. 6D, the foregoing separately describes processes in which the feature extraction model 431 fits the head model and the hand model of the person by using the parametric model. A feature map obtained by the feature extraction model 431 in a process of fitting the target object based on the image by using the parametric model may be information about a model of the target object. The information about the model is used to determine the model of the target object. For example, the information about the model is point cloud information of the model, for example, information about each grid vertex in the model. Alternatively, the information about the model is information about a fitting parameter, for example, information about a hidden variable z in an SMPL model. Optionally, the first semantic recognition model 432 may determine the model of the target object based on the information about the fitting parameter and the parametric model.

It can be learned from the foregoing several visual tasks that a plurality of visual tasks may be based on visual cognition of a same target object, but pieces of target semantic information of visual cognition processes that serve the plurality of visual tasks are different. Different visual tasks executed based on visual cognition of a same target object are referred to as associated visual tasks, and different visual cognition processes serving the associated visual tasks are referred to as visual cognition processes associated with each other. The following uses the visual task shown in Table 1 as an example to describe several associated visual tasks. Both the safe driving supervision task and the seat adjustment task in Table 1 are based on cognition for the head of the person. For understanding of the target semantic information of the two tasks, refer to content of the semantic information in Table 1. The safe driving supervision task and the seat adjustment task may be referred to as associated visual tasks in this embodiment of this application. Both the vehicle startup task and the gear switching task in Table 1 are based on cognition for the hand of the person. For the target semantic information of the two tasks, refer to content of the semantic information in Table 1. The vehicle startup task and the gear switching task may be referred to as associated visual tasks in this embodiment of this application.

The foregoing mentions that a plurality of visual tasks may be based on visual cognition for a same target object. The following explains "the same target object". A target object is an object on which a feature extraction model performs feature extraction. It is assumed that a feature map extracted by the feature extraction model includes a constructed 3D model. For the feature extraction model corresponding to FIG. 6A, the target object of the feature extraction model is the head of the person. For the feature extraction model corresponding to FIG. 6C, the target object of the feature extraction model is the hand of the person. For the feature extraction model for constructing a 3D model of a human body, the target object is a complete human body, including a head of a person and a hand of the person. Even if human body parts on which two visual tasks are based do not overlap (for example, the human body parts are respectively the human head and the human hand), if the target object (for example, the complete human body) for which the feature extraction model is targeted includes human body parts on which the two visual tasks are based, the two visual tasks may also be considered as associated visual tasks. For example, the target object on which the safe driving supervision task is based is the human head, and the target object on which the vehicle startup task based is the human hand. However, if the target object for which the feature extraction model is targeted includes the human head and the human hand, the safe driving supervision task and the vehicle startup task may also be referred to as associated visual tasks.

In an existing visual cognition process, semantic information is directly obtained through learning from an obtained image. Therefore, visual cognition processes serving different visual tasks are independent of each other. From a perspective of a circuit structure, still refer to FIG. 2 and FIG. 3. If a computer can execute the safe driving supervision task and the seat adjustment task, at least two visual systems (the visual system 23 shown in FIG. 2 and the visual system 33 shown in FIG. 3) need to be disposed in the computer. From a perspective of a visual cognition process, refer to FIG. 7A. An arrow 7a in FIG. 7A represents a machine learning model 1 that provides semantic information for a first visual task, and an arrow 7b in FIG. 7A represents a machine learning model 2 that provides semantic information for a second visual task. The machine learning model 1 and the machine learning model 2 need to sequentially perform feature extraction in a phase 1, a phase 2, and a phase 3 on a same image, to separately obtain a primal sketch, an intrinsic image, and a 3D description (or a 3D model) of a target object. Then, the machine learning model 1 and the machine learning model 2 respectively recognize, based on the extracted 3D model and respective visual task requirements, first target semantic information required by the first visual task and second target semantic information required by the second visual task.

It can be easily learned from the foregoing analysis that a repeated image processing process needs to be performed in existing visual cognition processes corresponding to associated visual tasks. In this embodiment of this application, the repeated image processing process is referred to as a redundant process. Existence of the redundant process wastes computer resources.

In a possible implementation, the resources of the device in this embodiment of this application may be, for example, one or more of resources such as a computing resource, a storage resource, and a network resource of the device.

In the foregoing embodiments of this application, the visual cognition process has been split. Based on this, to resolve a redundancy problem caused by the foregoing associated visual tasks, this embodiment of this application further proposes that the feature extraction model is enabled to participate in a plurality of visual cognition processes associated with each other. It is assumed that the first visual task and the second visual task are associated visual tasks. In this case, a first visual cognition process serving the first visual task and a second visual cognition process serving the second visual task are visual cognition processes associated with each other. For a same image, target semantic information required by the first visual task and target semantic information required by the second visual task are respectively the first target semantic information and the second target semantic information.

From a perspective of the circuit structure, a circuit structure shown in FIG. 7B may be configured to execute the first visual task and the second visual task. A sensor system 71 is used to obtain an image of a target object. A feature extraction model 72 is used to perform feature extraction on the image obtained by the sensor system 71, to obtain a first feature map and a second feature map. A first semantic recognition model 731 is used to perform semantic recognition on the first feature map, to obtain first target semantic information. A second semantic recognition model 732 is used to perform semantic recognition on the second feature map, to obtain second target semantic information. A first task execution system 741 is used to execute the first visual task based on the first target semantic information, and a second task execution system 742 is used to execute the second visual task based on the second target semantic information. It can be learned that a first visual system serving the first visual task and a second visual system serving the second visual task share the sensor system 71 and the feature extraction model 72. For understanding of each system or model in FIG. 7B, refer to the foregoing (for example, the embodiments corresponding to FIG. 4 and FIG. 5A). Details are not described herein again. For example, for understanding of the sensor system 71, refer to the sensor system 42 in the embodiments corresponding to FIG. 4 and FIG. 5A; for understanding of the feature extraction model 72, refer to the feature extraction model 431 in the embodiments corresponding to FIG. 4 and FIG. 5A; for the first semantic recognition model 731 or the second semantic recognition model 732, refer to the first semantic recognition model 432 in the embodiments corresponding to FIG. 4 and FIG. 5A; and for the first task execution system 741 and the second task execution system 742, refer to the first task execution system 41 in the embodiments corresponding to FIG. 4 and FIG. 5A.

It can be learned by comparing the circuit structures shown in FIG. 2 and FIG. 3 with the circuit structure shown in FIG. 7B that the method provided in this embodiment of this application helps reduce redundant processes between visual cognition processes that are associated with each other, and save resources of the first device.

From the perspective of the visual cognition process, refer to FIG. 7C. An arrow 7c represents a processing process shared by the first visual cognition process and the second visual cognition process. For example, the arrow 7c corresponds to the processing process performed by the feature extraction model 72 shown in FIG. 7B. An arrow 7d represents a processing process performed after the processing process represented by the arrow 7c in the first visual cognition process. For example, the arrow 7d corresponds to the processing process performed by the first semantic recognition model 731 shown in FIG. 7B. An arrow 7e represents a processing process performed after the processing process represented by the arrow 7c in the second visual cognition process. For example, the arrow 7e corresponds to the processing process performed by the second semantic recognition model 732 shown in FIG. 7B.

It can be easily learned by comparing FIG. 7A with FIG. 7C that the method provided in this embodiment of this application helps reduce redundant processes between visual recognition processes that are associated with each other, and helps save resources of the first device.

Based on descriptions corresponding to FIG. 7B and FIG. 7C, the following describes another possible embodiment of the information processing method in this application with reference to FIG. 8, to resolve the redundancy problem caused by the foregoing associated visual tasks. For understanding of each system or model in steps of the method embodiment corresponding to FIG. 8, refer to a corresponding system or model shown in FIG. 7B.

As shown in FIG. 8, another possible implementation of the information processing method in this application includes step 801 to step 808. Similar to that in FIG. 4 and FIG. 5A, the method may be applied to the first device. For descriptions of the first device, refer to corresponding descriptions corresponding to FIG. 4 and FIG. 5A. Details are not described herein again.

801: Obtain an image.

802: Input the image into a feature extraction model.

803: Obtain, from the feature extraction model, a first feature map corresponding to the image.

804: Input the first feature map into a first semantic recognition model.

805: Obtain, from the first semantic recognition model, first target semantic information corresponding to the first feature map.

For understanding of step 801 to step 805, respectively refer to step 501 to step 505 in the embodiment corresponding to FIG. 5A. Details are not described herein again.

806: Obtain, from the feature extraction model, a second feature map corresponding to the image.

For understanding of step 806, refer to descriptions of step 503 in the embodiment corresponding to FIG. 5A. The following mainly describes an association and a difference between the first feature map and the second feature map.

In a possible implementation, the first feature map and the second feature map may be the same. In this case, a first form that is of a target object and that is described by the first feature map and a second form that is of a target object and that is described by the second feature map are the same. However, because a first visual task and a second visual task are different, the first target semantic information and second target semantic information may be different.

Alternatively, in a possible implementation, the first feature map and the second feature map may be different. In this case, a first form and a second form may be different. For example, the first visual task is a safe driving supervision task, and the second visual task is a seat adjustment task. If a form described in the image includes a hairstyle, an eye feature, a nose feature, a face shape, a mouth shape, a lip color, and the like of a driver, the first feature map can describe the eye feature and the mouth shape in the foregoing form, and the second feature map can describe the eye feature, the mouth shape, the face shape, and the nose feature in the foregoing form.

A time sequence between step 806 and step 803, step 804, or step 805 is not limited in this embodiment of this application, provided that step 806 is performed after step 802.

807: Input the second feature map into a second semantic recognition model.

808: Obtain, from the second semantic recognition model, the second target semantic information corresponding to the second feature map.

For understanding of step 807 to step 808, respectively refer to descriptions of step 504 and step 505 in the embodiment corresponding to FIG. 5A. Input information of both the first semantic recognition model and the second semantic recognition model is from a same feature extraction model (for example, the feature extraction model 72 shown in FIG. 7B). However, because the first semantic recognition model and the second semantic recognition model respectively serve the first visual task and the second visual task, there are also some differences between the first semantic recognition model and the second semantic recognition model. The following mainly describes a difference between the first semantic recognition model (for example, the first semantic recognition model 731 shown in FIG. 7B) and the second semantic recognition model (for example, the second semantic recognition model 732 shown in FIG. 7B).

Optionally, the difference between the first semantic recognition model and the second semantic recognition model may be represented in the following: A training process of the second semantic recognition model and a training process of the first semantic recognition model are independent of each other. For example, for understanding that the training processes are independent of each other, refer to the explanation that the training processes of the feature extraction model 431 and the first semantic recognition model 432 are independent of each other in the embodiments corresponding to FIG. 4 and FIG. 5A. Details are not described herein again.

It should be noted that the training process of the second semantic recognition model and the training process of the first semantic recognition model are independent of each other. That the training process of the second semantic recognition model and the training process of the first semantic recognition model definitely correspond to different machine learning models is not limited. In a possible implementation, the training process of the second semantic recognition model and the training process of the first semantic recognition model may be integrated into a same machine learning model (for example, a neural network model).

Alternatively, optionally, the difference may be represented in the following: The first visual task served by the second semantic recognition model and the second visual task served by the first semantic recognition model are different. For example, the second visual task and the first visual task that are different are respectively any two visual tasks in Table 1, provided that the target objects of the feature extraction model include objects on which the two visual tasks are based. For example, if the target object of the feature extraction model is the head of the person, the first visual tasks are respectively the safe driving supervision task and the seat adjustment task in Table 1. If the target object of the feature extraction model is all parts of the person in the image, the first visual tasks are respectively any two different tasks in the safe driving supervision task, the seat adjustment task, the vehicle startup task, and the gear switching task in Table 1. Optionally, that the first visual task and the second visual task are different may be reflected in the following: The first visual task and the second visual task belong to different task types in the following task types: behavior recognition, human posture estimation, scenario understanding, semantic segmentation, target detection, and image classification. Alternatively, optionally, that the first visual task and the second visual task are different may be reflected in the following: Information types output in a process of executing the first visual task and the second visual task are different. The information types include but are not limited to voice information, an image, and control information. Alternatively, when the information types are the same, information content is different. For example, different voice information or images are output, or output control information is used to control different devices.

Alternatively, optionally, this difference may be represented in the following: For a same image, the input first feature map and the input second feature map are different. That the first feature map and the second feature map are different may mean that visual processing levels corresponding to the first feature map and the second feature map are different. For example, if the first semantic recognition model may determine the first target semantic information based on a two-dimensional image, and the second semantic recognition model needs to determine the second target semantic information based on a three-dimensional image, the first feature map may be a feature map obtained through low-level visual processing, for example, the feature maps shown in FIG. 5B and FIG. 5C. The second feature map may be a feature map obtained through middle-level or high-level visual processing, for example, the feature maps shown in FIG. 5D to FIG. 5F.

Alternatively, the difference may be represented in the following: The first feature map and the second feature map are the same, but the first target semantic information and the second target semantic information are different. For example, refer to the vehicle startup task and the gear switching task in Table 1. For a same hand posture, the first target semantic information represents "OK", and the second target semantic information represents "a number is 2".

It can be learned from the foregoing descriptions that the second feature map and the first feature map may be the same or may be different. When the first feature map and the second feature map are the same, the first form and the second form are the same. In addition, optionally, either step 803 or step 806 may be performed. If the first feature map and the second feature map are different, the first form and the second form may also be different.

Optionally, the first device may further perform the following step 809 and step 810.

809: Execute the first visual task based on the first target semantic information.

810: Execute the second visual task based on the second target semantic information.

For understanding of step 809 and step 810, refer to step 506 in the embodiment corresponding to FIG. 5A.

It should be noted that, in this embodiment of this application, that the first device can execute the first visual task based on only the first target semantic information is not limited. The first device may further execute the first visual task based on other information (for example, semantic information output by another semantic recognition model). Similarly, in this embodiment of this application, that the first device can execute the second visual task based on only the second target semantic information is not limited. The first device may further execute the second visual task based on other information (for example, semantic information output by another semantic recognition model).

That the second semantic recognition model corresponds to only one machine learning model is not limited in this embodiment of this application. In a possible implementation, the second semantic recognition model may correspond to two or more models obtained through training by using a machine learning method. In a possible implementation, the machine learning model corresponding to the second semantic recognition model may be a neural network model. Alternatively, in a possible implementation, the second semantic recognition model corresponds to one or more network layers in one neural network model.

In a possible implementation, the structure shown in FIG. 2, the structure shown in FIG. 3, the structure shown in FIG. 4, or the structure shown in FIG. 7B may be disposed in a same physical entity (for example). The foregoing describes the information processing method performed by the first device. In a possible implementation, the first device may send obtained semantic information (for example, the first target semantic information and/or the second target semantic information) to another device (referred to as a second device), to indicate the second device to execute a visual task based on the received semantic information. For example, the second device executes the first visual task based on the first target semantic information, or executes the second visual task based on the second target semantic information, or executes the first visual task based on the first target semantic information and executes the second visual task based on the second target semantic information. In a possible implementation, the image obtained by the first device is obtained by the second device.

For example, the first device in the embodiment corresponding to FIG. 5A or FIG. 8 is a server, and the second device is the vehicle a shown in FIG. 1A or FIG. 1C. Semantic information output by the server may be used to support another device in executing a visual task. For example, after obtaining an image, the camera 11 and/or the camera 12 on the vehicle a send/sends the image to the server. The server performs step 501 to step 505 shown in FIG. 5A, to obtain the first target semantic information, and then sends the first target semantic information to the vehicle a, to indicate the vehicle a to execute the first visual task based on the first target semantic information. Alternatively, for example, after obtaining an image, the camera 11 and/or the camera 12 on the vehicle a send/sends the image to the server, and the server performs step 801 to step 808 shown in FIG. 8. After obtaining the first target semantic information, the server sends the first target semantic information to the vehicle a, to indicate the vehicle a to execute the first visual task based on the first target semantic information. After obtaining the second target semantic information, the server sends the second target semantic information to the vehicle a, to indicate the vehicle a to execute the second visual task based on the second target semantic information.

The foregoing describes the method in embodiments of this application, and the following describes an apparatus in embodiments of this application.

An embodiment of this application provides a computing device. FIG. 9 is a schematic diagram of a possible structure of a computing device 9 according to an embodiment of this application. As shown in FIG. 9, the computing device 9 includes a processor 901 and a memory 902.

The processor 901 may be one or more CPUs, and the CPU may be a single-core CPU, or may be a multi-core CPU.

The memory 902 includes but is not limited to a random access memory (RAM), a read-only memory (ROM), an erasable programmable read-only memory (EPROM), a flash memory, an optical memory, or the like. The memory 902 stores instructions, or computer-readable instructions, or code of an operating system and program instructions, or computer program instructions, or a function program. Optionally, the memory 902 may be a nonvolatile memory or a volatile memory.

Optionally, the computing device 9 further includes a sensor system 903, and the sensor system 903 may include several sensors configured to obtain an image. For example, the sensor system 903 may include a radar, an infrared detector, and a camera. The camera may include a full-color camera and/or a depth camera.

Optionally, the computing device 9 further includes a communication interface 904. The communication interface 904 may be a wired interface, for example, a fiber distributed data interface (FDDI) or a gigabit Ethernet (GE) interface. Alternatively, the communication interface 904 may be a wireless interface. The communication interface 904 is configured to receive network data from an internal network and/or an external network.

Optionally, the data processing apparatus further includes a bus 905. The processor 901 and the memory 902 are usually connected to each other through the bus 905, or may be connected to each other in another manner.

Optionally, the data processing apparatus further includes an output interface 906. The output interface 906 is connected to an output device, and is configured to output a voice, an image, or the like to a user by using the output device. The output device includes but is not limited to a display, a printer, a speaker, and the like.

The processor 901 reads and executes the program instructions stored in the memory 902, so that the computing device 9 performs the method performed by the first device in the foregoing method embodiment. For example, the processor 901 reads and executes the program instructions stored in the memory 902, so that the computing device 9 performs step 501 to step 506 in the embodiment shown in FIG. 5A, or step 601A to step 606A in the embodiment shown in FIG. 6A, or step 601C to step 606C in the embodiment shown in FIG. 6C, or step 801 to step 810 in the embodiment shown in FIG. 8. For more details of reading and executing, by the processor 901, the stored program instructions to enable the computing device 9 to perform the foregoing steps, refer to corresponding descriptions in the foregoing method embodiments. Details are not described herein again.

Optionally, these instructions are stored in a memory outside the computing device. When these instructions are decoded and executed by the processor 901 of the computing device 9, the memory 902 in the computing device 9 temporarily stores some or all content of the instructions. Optionally, some content of these instructions is stored in the memory outside the computing device 9, and other content of these instructions is stored in the memory 902 inside the computing device 9.

In a possible implementation, the computing device may be a computer device. In a possible implementation, the computing device 9 may be a server, an apparatus in a server, or an apparatus used together with a server, or may be a terminal, an apparatus in a terminal, or an apparatus used together with a terminal. In a possible implementation, the terminal may be, for example, a handheld terminal or various types of robots or vehicle-mounted terminals. In a possible implementation, the handheld terminal may be, for example, a mobile phone, a notebook computer, a tablet computer, or a smart band. In a possible implementation, the robot may be, for example, a freight robot, a detection robot, a vacuum cleaning robot, or another type of robot. In a possible implementation, the vehicle-mounted terminal may be an entire vehicle system, a head unit, a vehicle-mounted computer, or the like.

An embodiment of this application further provides a chip system, including a processor and an interface circuit. The processor is configured to be coupled to a memory through the interface circuit. The processor is configured to run instructions (or computer-readable instructions, computer program instructions, a function program, or program code), to implement the method provided in any one of the foregoing method embodiments of this application.

In an example, the processor may execute instructions stored in the memory, so that the chip system performs any one of the foregoing method embodiments. Optionally, the memory may be a storage unit in the chip system, for example, a register or a cache. Alternatively, the memory may be a memory that is in a computer device and that is located outside the chip system, for example, a read-only memory (ROM) or another type of static storage device that can store static information and instructions, or a random access memory (RAM). Optionally, the memory may be a nonvolatile memory or a volatile memory. Optionally, the processor may be a general-purpose central processing unit (CPU), a microprocessor, an application-specific integrated circuit (ASIC), or one or more integrated circuits configured to control program execution of any one of the foregoing method embodiments.

An embodiment of this application provides an information processing apparatus. The information processing apparatus may be the first device mentioned in the method in embodiments of this application, or an apparatus in the first device, or an apparatus that can match the first device for use. In a possible implementation, the information processing apparatus may include a module for performing the method shown in FIG. 5A, FIG. 6A, FIG. 6C, or FIG. 8. The module may be a hardware circuit, or may be a module in a form of software, or may be a module implemented by a hardware circuit in combination with software.

FIG. 10 is a schematic diagram of a possible structure of an information processing apparatus 10 according to an embodiment of this application. As shown in FIG. 10, the information processing apparatus 10 includes an image obtaining module 1001, a feature extraction module 1002, and a first semantic recognition module 1003. Optionally, the information processing apparatus 10 further includes a first task execution module 1004. Optionally, the information processing apparatus 10 further includes a second semantic recognition module 1005. Optionally, the information processing apparatus 10 further includes a second task execution module 1006.

The image obtaining module 1001 is configured to perform step 501 in the embodiment shown in FIG. 5A, the feature extraction module 1002 is configured to perform step 502 and step 503 in the embodiment shown in FIG. 5A, the first semantic recognition module 1003 is configured to perform step 504 and step 505 in the embodiment shown in FIG. 5A, and the first task execution module 1004 is configured to perform step 506 in the embodiment shown in FIG. 5A.

Alternatively, the feature extraction module 1002 is configured to perform step 601A to step 606A in the embodiment shown in FIG. 6A.

Alternatively, the feature extraction module 1002 is configured to perform step 601C to step 606C in the embodiment shown in FIG. 6C.

Alternatively, the image obtaining module 1001 is configured to perform step 801 in the embodiment shown in FIG. 8, the feature extraction module 1002 is configured to perform step 802, step 803, and step 806 in the embodiment shown in FIG. 8, the first semantic recognition module 1003 is configured to perform step 804 and step 805 in the embodiment shown in FIG. 8, the second semantic recognition module 1005 is configured to perform step 807 and step 808 in the embodiment shown in FIG. 8, the first task execution module 1004 is configured to perform step 809 in the embodiment shown in FIG. 8, and the second task execution module 1006 is configured to perform step 810 in the embodiment shown in FIG. 8.

In a possible implementation, the information processing apparatus 10 may further include a communication module (not shown in FIG. 10). The communication module is configured to: generate a first message based on first target semantic information obtained by the first semantic recognition module 1003, and send the first message to a second device, to indicate the second device to execute a first visual task. In a possible implementation, the communication module (not shown in FIG. 10) is further configured to: generate a second message based on second target semantic information obtained by the second semantic recognition module 1005, and send the second message to the second device, to indicate the second device to execute a second visual task.

Module division in the information processing apparatus 10 described in FIG. 10 is merely an example. The module division is merely logical function division and may be other division in an actual implementation. For example, a plurality of modules or components may be combined or integrated into another system, or some features may be ignored or may not be performed. Functional modules in the information processing apparatus may be integrated into one processing module, or each of the modules may exist alone physically, or two or more modules may be integrated into one module.

The modules in FIG. 10 may be implemented in a form of hardware, or may be implemented in a form of a software functional unit. For example, when software is used for implementation, the modules in FIG. 10 may be implemented by software function modules generated after the processor 901 in FIG. 9 reads the program code stored in the memory 902. Alternatively, the modules in FIG. 10 may be separately implemented by different hardware in FIG. 9. For example, the image obtaining module 1001 may be implemented by using the sensor system 903, or implemented by using the communication interface 904; the communication module (not shown in FIG. 10) is implemented by using the communication interface 904 in FIG. 9; and the feature extraction module 1002, the first semantic recognition module 1003, the first task execution module 1004, the second semantic recognition module 1005, and the second task execution module 1006 are completed by using some processing resources (for example, another core in a multi-core processor) in the processor 901 in FIG. 9 or by using a programmable device such as a field-programmable gate array (FPGA) or a coprocessor. It is clear that the foregoing functional modules may alternatively be implemented in a manner of combining software and hardware. For example, the image obtaining module 1001 is implemented by using the sensor system 903; and the feature extraction module 1002, the first semantic recognition module 1003, the first task execution module 1004, the second semantic recognition module 1005, and the second task execution module 1006 are implemented by using software function modules generated after the processor 901 reads the program instructions stored in the memory 902.

The coupling in this embodiment of this application is an indirect coupling or a communication connection between apparatuses, units, or modules, may be in an electrical form, a mechanical form, or another form, and is used for information exchange between the apparatuses, the units, or the modules.

A person of ordinary skill in the art may understand that when software is used to implement the aspects or possible implementations of the aspects in embodiments of this application, all or some of the aspects or the possible implementations of the aspects may be implemented in a form of a computer program product. The computer program product refers to instructions (or a computer-readable instructions or computer program instructions or a function program or program code) stored in a computer-readable medium. When these instructions are loaded and executed on a computer, all or some of the processes or the functions according to embodiments of this application are generated.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any proper combination thereof. For example, the computer-readable storage medium is a random access memory (RAM), a read-only memory (ROM), an erasable programmable read-only memory (EPROM), or a compact disc read-only memory (CD-ROM).

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a distinguishing manner used when objects that have a same attribute are described in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device. In embodiments of this application, the term "a plurality of" means two or more than two.

It is clear that a person skilled in the art may make various modifications and variations to the present invention without departing from the scope of the present invention. In this way, the present invention is intended to cover these modifications and variations provided that they fall within the scope of protection defined by the following claims.

What is claimed is:

1. An information processing method, comprising:
obtaining an image;
inputting the image into a feature extraction model, wherein the feature extraction model is used to extract a feature map of a target object based on an input image;
obtaining, from the feature extraction model, a first feature map corresponding to the image, wherein the first feature map describes a first form of the target object, wherein obtaining the first feature map comprises performing a three-dimensional model reconstruction process on the target object, and wherein the three-dimensional model reconstruction process comprises generating a primal sketch based on the image, deriving an intrinsic image based on the primal sketch, and forming a three-dimensional model of the target object based on the intrinsic image;
inputting the first feature map into a first semantic recognition model, wherein the first semantic recognition model is used to determine first semantic information based on an input feature map; and
obtaining, from the first semantic recognition model, first target semantic information corresponding to the first feature map, wherein the first target semantic information describes a meaning expressed by the first form.

2. The information processing method according to claim 1, wherein a training process of the feature extraction model and a training process of the first semantic recognition model are independent of each other.

3. The information processing method according to claim 2, wherein the first feature map comprises information about a three-dimensional model, and the three-dimensional model is determined by the feature extraction model by fitting the target object based on the image by using a parametric model.

4. The information processing method according to claim 3, wherein the information about the three-dimensional model comprises at least one of information about a grid vertex in the three-dimensional model or information about a fitting parameter, and the information about the fitting parameter is used to determine the three-dimensional model based on the parametric model.

5. The information processing method according to claim 1, wherein after the inputting the image into a feature extraction model, the information processing method further comprises:

obtaining, from the feature extraction model, a second feature map corresponding to the image, wherein the second feature map describes a second form of the target object;

inputting the second feature map into a second semantic recognition model, wherein the second semantic recognition model is used to determine second semantic information based on an input feature map; and obtaining, from the second semantic recognition model, second target semantic information corresponding to the image, wherein the second target semantic information describes a meaning expressed by the second form.

6. The information processing method according to claim 5, wherein a training process of the first semantic recognition model and a training process of the second semantic recognition model are independent of each other.

7. The information processing method according to claim 6, wherein the information processing method further comprises:

executing a first visual task based on the first target semantic information; and executing a second visual task based on the second target semantic information.

8. The information processing method according to claim 1, wherein the image is from sensing information of a vehicle-mounted sensor.

9. The information processing method according to claim 8, wherein the vehicle-mounted sensor comprises at least one of the following sensors:

a radar, an infrared detector, a depth camera, a full-color camera, or a fisheye camera.

10. The information processing method according to claim 1, wherein the target object comprises a person, a vehicle, or a road scenario.

11. An information processing apparatus, comprising at least one processor and one or more memories coupled to the at least one processor, wherein the one or more memories store instructions for execution by the at least one processor to:

obtain an image;

input the image into a feature extraction model, wherein the feature extraction model is used to extract a feature map of a target object based on an input image;

obtain, from the feature extraction model, a first feature map corresponding to the image, wherein the first feature map describes a first form of the target object, wherein obtaining the first feature map comprises performing a three-dimensional model reconstruction process on the target object, and wherein the three-dimensional model reconstruction process comprises generating a primal sketch based on the image, deriving an intrinsic image based on the primal sketch, and forming a three-dimensional model of the target object based on the intrinsic image;

input the first feature map into a first semantic recognition model, wherein the first semantic recognition model is used to determine first semantic information based on an input feature map; and obtain, from the first semantic recognition model, first target semantic information corresponding to the first feature map, wherein the first target semantic information describes a meaning expressed by the first form.

12. The information processing apparatus according to claim 11, wherein a training process of the feature extraction model and a training process of the first semantic recognition model are independent of each other.

13. The information processing apparatus according to claim 12, wherein the first feature map comprises information about a three-dimensional model, and the three-dimensional model is determined by the feature extraction model by fitting the target object based on the image by using a parametric model.

14. The information processing apparatus according to claim 13, wherein the information about the three-dimensional model comprises at least one of information about a grid vertex in the three-dimensional model or information about a fitting parameter, and the information about the fitting parameter is used to determine the three-dimensional model based on the parametric model.

15. The information processing apparatus according to claim 11, wherein the one or more memories store instructions for execution by the at least one processor to:

obtain, from the feature extraction model, a second feature map corresponding to the image, wherein the second feature map describes a second form of the target object;

input the second feature map into a second semantic recognition model, wherein the second semantic recognition model is used to determine second semantic information based on an input feature map; and obtain, from the second semantic recognition model, second target semantic information corresponding to the image, wherein the second target semantic information describes a meaning expressed by the second form.

16. The information processing apparatus according to claim 15, wherein a training process of the first semantic recognition model and a training process of the second semantic recognition model are independent of each other.

17. The information processing apparatus according to claim 16, wherein the one or more memories store instructions for execution by the at least one processor to:

execute a first visual task based on the first target semantic information; and execute a second visual task based on the second target semantic information.

18. The information processing apparatus according to claim 17, wherein the image is from sensing information of a vehicle-mounted sensor.

19. The information processing apparatus according to claim 18, wherein the vehicle-mounted sensor comprises at least one of the following sensors: a radar, an infrared detector, a depth camera, a full-color camera, or a fisheye camera.

20. A non-transitory computer-readable storage medium, wherein the non-transitory computer-readable storage medium stores programming instructions for execution by at least one processor to:

obtain an image;

input the image into a feature extraction model, wherein the feature extraction model is used to extract a feature map of a target object based on an input image;

obtain, from the feature extraction model, a first feature map corresponding to the image, wherein the first feature map describes a first form of the target object, wherein obtaining the first feature map comprises performing a three-dimensional model reconstruction process on the target object, and wherein the three-dimensional model reconstruction process comprises generating a primal sketch based on the image, deriving an intrinsic image based on the primal sketch, and forming a three-dimensional model of the target object based on the intrinsic image;

input the first feature map into a first semantic recognition model, wherein the first semantic recognition model is used to determine first semantic information based on an input feature map; and obtain, from the first semantic recognition model, first target semantic information corresponding to the first feature map, wherein the first target semantic information describes a meaning expressed by the first form.

* * * * *